US012705693B2

(12) United States Patent
Sharma et al.

(10) Patent No.: US 12,705,693 B2
(45) Date of Patent: Aug. 11, 2026

(54) TRAINING PROCESSES FOR MACHINE LEARNING SUPER-RESOLUTION MODELS

(71) Applicant: Microsoft Technology Licensing, LLC, Redmond, WA (US)

(72) Inventors: Mahima Sharma, Seattle, WA (US); Matthew Lawrence Bronder, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 18/678,945

(22) Filed: May 30, 2024

(65) Prior Publication Data

US 2025/0371659 A1 Dec. 4, 2025

(51) Int. Cl.

*G06T 3/4053* (2024.01)
*G06T 5/50* (2006.01)
*G06T 5/60* (2024.01)

(52) U.S. Cl.

CPC .............. *G06T 3/4053* (2013.01); *G06T 5/50* (2013.01); *G06T 5/60* (2024.01); *G06T 2207/20016* (2013.01); *G06T 2207/20081* (2013.01)

(58) Field of Classification Search

CPC ........... G06T 3/4053; G06T 5/50; G06T 5/60; G06T 2207/20016; G06T 2207/20081; G06T 3/4046

See application file for complete search history.

(56) References Cited

U.S. PATENT DOCUMENTS 11,790,489 B2 * 10/2023 Ren ........................ G06N 3/088 382/100
11,989,960 B2 * 5/2024 Wilkinson, Jr. ...... G06F 18/214
2020/0034948 A1 1/2020 Park
2024/0168188 A1 5/2024 Hamida

FOREIGN PATENT DOCUMENTS

CN 111915491 A 11/2020
CN 116362974 A 6/2023

OTHER PUBLICATIONS

Translation of CN_111915491 (Year: 2020).*
Translation of CN_116362974 (Year: 2023).*
International Search Report and Written Opinion received for PCT Application No. PCT/US2025/018037, mailed on Jun. 13, 2025, 13 pages.
Rahman, et al., "Deep Learning: An Empirical Study on Kimia Path24", 2022 IEEE International IOT, Electronics and Mechatronics Conference (IEMTRONICS), Jun. 2022, pp. 1-9.

* cited by examiner

*Primary Examiner* — Wassim Mahrouka
(74) *Attorney, Agent, or Firm* — Workman Nydegger

(57) ABSTRACT

Systems and methods are provided for dynamically modifying the training of super-resolution models. In some instances, a set of training data is obtained that includes pairings of low-resolution and correlated high-resolution images. The training data is separated into a training group and a validation group. During a training cycle, a super-resolution model is applied to the training group over multiple epochs. After each epoch, the model is applied to the validation data to calculate a loss value. A rate of change in the loss value between the different epochs is determined, and a predetermined rate of change threshold is identified. The training cycle is terminated when the rate of change in the loss value meets or is less than the predetermined threshold.

20 Claims, 16 Drawing Sheets

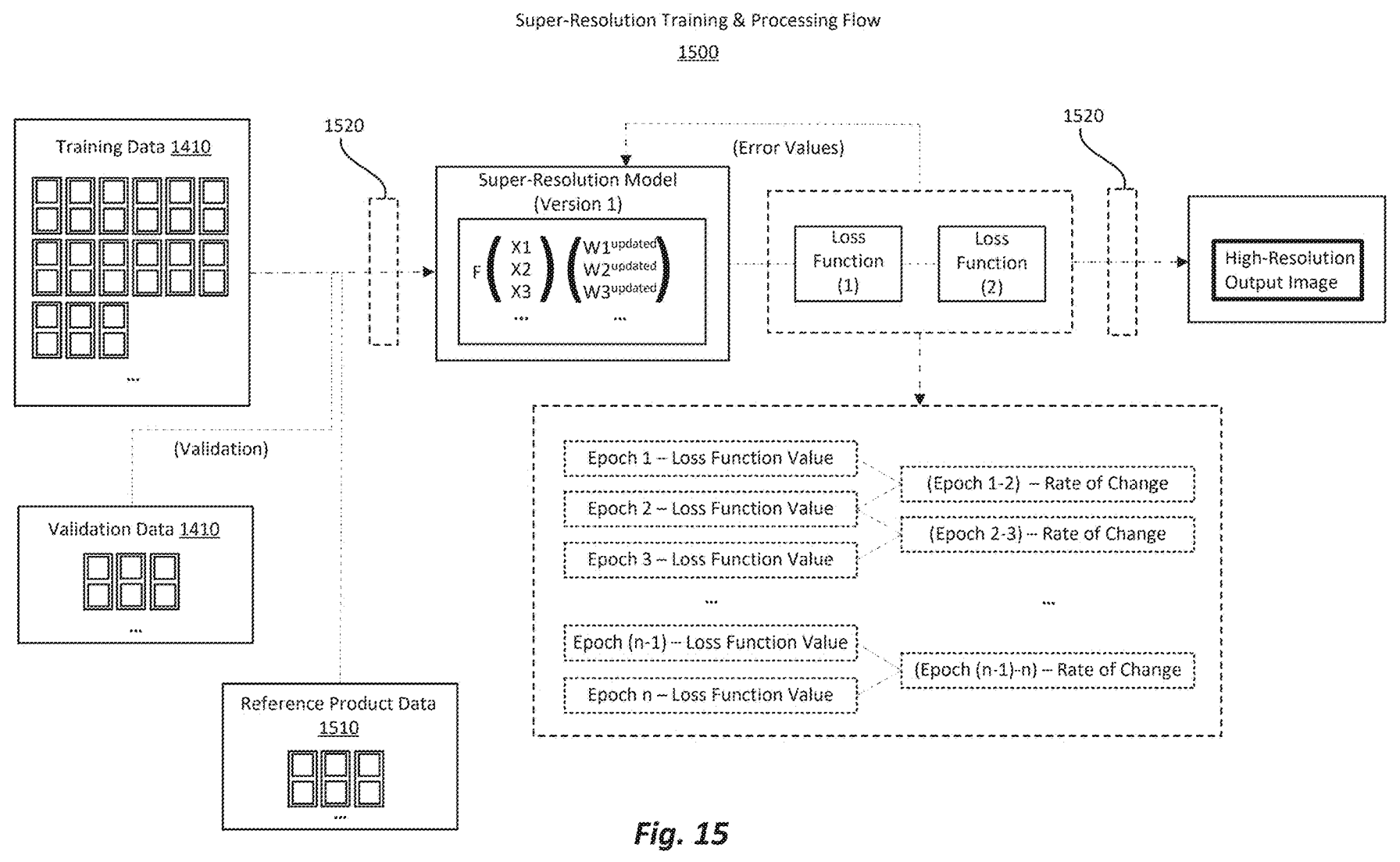

Super-Resolution Training & Processing Flow
1500

Training Data 1410

Validation Data 1410

(Validation)

Reference Product Data
1510

1520

1520

Super-Resolution Model
(Version 1)

$F(X1, X2, X3, \ldots)(W1^{updated}, W2^{updated}, W3^{updated}, \ldots)$ (Error Values)

Loss Function (1)

Loss Function (2)

High-Resolution Output Image

Epoch 1 -- Loss Function Value

Epoch 2 -- Loss Function Value

Epoch 3 -- Loss Function Value

...

Epoch (n-1) -- Loss Function Value

Epoch n -- Loss Function Value (Epoch 1-2) -- Rate of Change (Epoch 2-3) -- Rate of Change

...

(Epoch (n-1)-n) -- Rate of Change

*Fig. 15*

TRAINING PROCESSES FOR MACHINE LEARNING SUPER-RESOLUTION MODELS

BACKGROUND

With conventional image processing, it is possible to render images at a variety of display resolutions. This is particularly beneficial for enabling content that is saved at one resolution to be rendered at different resolutions on a plurality of different display devices having different display capabilities. For example, images that are saved at low resolutions can be upscaled to higher resolutions for display on high-resolution displays.

The upscaling of images is sometimes referred to as super-resolution processing. With super-resolution processing, a higher resolution image of a base image is generated by rendering the base image with a higher pixel density than the underlying base image. For example, a base image having a 2K resolution (1920×1080 pixel resolution) can be upscaled to a 4K resolution image (3840×2160 pixel resolution) by converting each of the pixels in the base image into four new upscaled pixels.

Super-resolution processes utilize specialized algorithms that are configured to generate outputs comprising new details for the newly upscaled pixels, which are not present in the underlying pixels, and such that the new upscaled pixels are not mere duplicates of the underlying base pixels from which they depend. By way of example, each of the new pixels in an upscaled image will usually contain a unique set of properties that are derived from some combination of the underlying base pixels' properties, as well as the properties of the neighboring pixels that are contained within the base image and, in some instances, the new pixel properties will also be based at least in part on the properties of other new neighboring pixels of the upscaled image.

Many different types of super-resolution algorithms and techniques can be used to upscale and enhance an image. For instance, some super-resolution processes can be used to smooth out the edges of the new pixels that are being generated. Some super-resolution processes can also be used to cause the final upscaled images to appear more detailed than the underlying images from which they are based. The super-resolution model algorithms can be tuned for different desired outcomes and styles by controlling algorithm weights applied to control variables or parameters of the algorithms that are based on attributes of the images being processed.

Recent developments in computer technologies include the creation of machine learning models that can be trained to perform various tasks, including upscaling and other forms of super-resolution image processing. Super-resolution machine learning models, for example, can be configured with one or more of the super-resolution processing algorithms that are trained to perform super-resolution processing on a particular type or class of lower-resolution images by applying the models to training data that comprises pairs of low-resolution and high-resolution images and in such a manner as to consistently generate images of a high-resolution based on inputs comprising low-resolution images, similar to the training data.

The use of super-resolution models for assisting with image upscaling is particularly helpful in the gaming industry since many gaming engines are configured to produce initial image outputs that are oftentimes generated at initial resolutions that are lower than the high-resolution displays where the gaming content is rendered.

The more training that a super-resolution model undergoes for different domains (e.g., video games and other software titles) and end-use scenarios (e.g., desired upscaling, image formatting, image rendering styles), the better the model can perform in generating the desired outputs during runtime.

Because gaming systems are often configured to process images with different styles and formats, the super-resolution models need to be trained with training data comprising images that are similar to the image content of the domains (e.g., games) that will be processed by the different gaming systems and end-use scenarios. The more similar the training data is to the target domain, the better the super-resolution model will perform when generating the super-resolution images in the target domain. Unfortunately, it is not always easy to obtain training data from the target domain (e.g., a particular game or software title) and it is necessary to rely on training data that is similar, but may not be the exact same as or from the same source as the target domain.

The training of a super-resolution model typically involves multiple iterations, or epochs, of applying the model to the training data. During each training epoch, the model processes the training data and adjusts its internal parameters or algorithm weights based on the difference, or loss, between the model's output and target output. This loss is calculated using one or more loss functions, which quantify the difference between the model's output and the target output in a way that the model can use to adjust its parameters. Eventually, the changes required to modify or fit the model for a particular process will culminate or converge to a point where there may be a diminishing return for applying the model to the training data relative to the resources required to apply the model to the training data. This can be particularly true when there is only a limited set of training data.

Some of the known problems associated with training a model can also include underfitting or overfitting a model to a certain domain. By way of example, if a model is applied to a discrete and focused set of training data for one domain too many times, it may overfit the model to that domain while regressing or simultaneously being degraded in its performance relative to a different domain. Alternatively, if a model is not applied to enough variety and quantity of training data relevant to the target domain, the model may also perform poorly when image processing within the target domain. Accordingly, it can be very important to determine what types and quantities of training data to apply a model to.

In view of the foregoing, it will be appreciated that the training of super-resolution machine learning models involves incredibly complex and computationally expensive processes. Accordingly, any improvements in the manner in which machine learning models can be trained, particularly improvements that can reduce the overall training time and/or computational costs of the training, while increasing the utility of the models, are desired.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments include techniques for generating and utilizing training data for training machine learning models that are configured for performing super-resolution image processing. Some embodiments include managing the training cycles of machine learning models by validating training of the model during the training and by terminating training when it is determined the returns of the training have diminished beyond target thresholds.

In some aspects, the techniques described herein relate to methods for training a super-resolution model that is configured to transform images from a first resolution to a second resolution, the second resolution including a relatively higher-resolution than the first resolution. These methods include: obtaining a set of training data including a plurality of correlated image pairings, each correlated image pairing including a first image at a first resolution and a correlated second image at a second resolution, the correlated second image including a higher-resolution representation of the first image; separating the set of training data into a first grouping including training data and a second grouping including validation data; training the super-resolution model with the training data of the first grouping during a training cycle that includes a plurality of epochs of the super-resolution model processing the first grouping of training data and during which one or more loss functions are used with the super-resolution model to identify error values that are used to modify the super-resolution model; after each epoch performed during the training mode, applying the super-resolution model to the validation data to calculate a loss value based on at least one loss function of the super-resolution model; determining a rate of change in the calculated loss value between different epochs; identifying a predetermined rate of change threshold associated with terminating the training mode; and terminating the training cycle when the rate of change in the calculated loss value meets or is less than the predetermined rate of change threshold.

In some aspects, the techniques described herein also relate to a computing system including: a hardware processing system including a hardware processor; and one or more storage devices storing executable instructions that are executed by the hardware processing system for causing the computing system to perform operations including: obtaining a set of training data including a plurality of correlated image pairings, each correlated image pairing including a first image at a first resolution and a correlated second image at a second resolution, the correlated second image including a higher-resolution representation of the first image; separating the set of training data into a first grouping including training data and a second grouping including validation data; applying the super-resolution model to the training data of the first grouping during a training cycle that includes a plurality of epochs of the super-resolution model processing the first grouping of training data and during which one or more loss functions are used with the super-resolution model to identify error values that are used to modify the super-resolution model; iteratively, after each of one or more epochs performed during the training mode, applying the super-resolution model to the validation data to calculate a loss value based on at least one loss function of the super-resolution model; determining a rate of change in the calculated loss value between different epochs; identifying a predetermined rate of change threshold associated with terminating the training mode; and terminating the training cycle when the rate of change in the calculated loss value meets or is less than the predetermined rate of change threshold.

Performance improvements resulting from the disclosed training embodiments can include a convergence of similarity between a desired target output and the actual output generated from the disclosed models. Performance improvements can also include an increase in processing efficiency (e.g., lower computational cost) for performing the super-resolution processing. In this manner, the training data can be used to generate a trained super-resolution model that has improved performance relative to the super-resolution model prior to undergoing the training.

By validating the training and by limiting the training that is performed, in some instances, it is possible to conserve resources that would be wasted or that have a diminishing return when applied to the training. It is also possible, in some instances, to help prevent the model from being overfit for certain domains and end-use scenarios in such a way that would be detrimental to the performance of the model in different domains and end-use scenarios.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 15 illustrates another example of a processing flow associated with training process and utilizing training data during training of super-resolution models.

DETAILED DESCRIPTION

Figure 1:
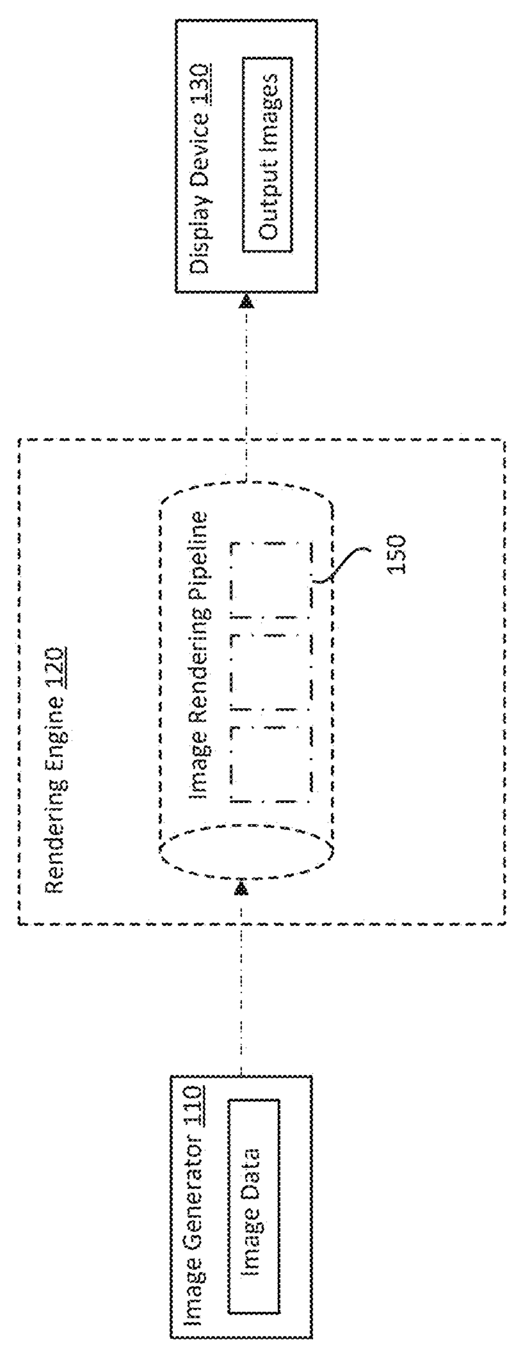
FIG. 1 illustrates an example of an image processing flow associated with the generation of images from an image generator.

As noted above, the disclosed embodiments include methods and systems for generating and using training data for training super-resolution models, wherein the training data comprises correlating image pairings, and where each correlating image pair or pairing comprises a low-resolution image and a correlating high-resolution image.

The image pairings are generated, in some embodiments, by modifying an image generator that was initially configured to generate image output in only a single resolution at a time. The modification to the image generator enables the substantially simultaneous generation of two or more sets of images, depicting the same content, in different resolutions. The substantially simultaneous generation of the two sets of images may occur at exactly the same periods of time or, alternatively, at different periods of time that are at least partially overlapping, such as with parallel processing by the image generator and wherein both sets of images at different resolutions are still based on the same shared content (e.g., scenes or frames).

The two sets of images can then be paired together into training data. In particular, a low-resolution image and a corresponding high-resolution image for a plurality of different frames of image data are paired together as training data for training a super-resolution model.

The paired images can include all image data that is generated (e.g., low-resolution and high-resolution images for each of the plurality of different frames) or, alternatively, for only a subset of the image data that is generated (e.g., low-resolution and high-resolution images for only some of the plurality of the different frames generated). Additionally, the paired image data can include the entirety of the paired low-resolution and high-resolution images, or alternatively, only limited corresponding sub-portions of the paired low-resolution and high-resolution images.

One or more super-resolution models are trained by applying the super-resolution models to the training data during training cycles that include a plurality of epochs until the rate of change during the training reaches a particular rate of change threshold, as will be described in more detail below particularly in reference to FIGS. 13-16.

After training, the super-resolution models are used to generate high-resolution images, with resolutions that are the same as or similar to the high-resolution images in the image pairings having the same quality or resolution attribute, based on new input low-resolution images, with resolutions that are the same as or similar to the low-resolution images in the image pairings.

It will be appreciated that references to images having the same or similar resolutions mean that the resolutions have the same or similar sharpness, clarity, and/or pixel density. If the resolutions are the same, for example, then they are identical (i.e., they have identical sharpness, and/or pixel density based on an objective scale of those measures). If the resolutions are similar, then then the sharpness, clarity, and/or pixel density of one resolution is within 99%, 98%, 97%, 96%, 95%, between 95%-90%, between 85%-80% of the corresponding sharpness and/or pixel density of the comparable resolution. In some cases the term “image resolution” refers to the number of pixels in an image such that higher-resolution images have more pixels than lower-resolution images.

By modifying existing image generators, such as gaming engines and other imaging engines that are capable of generating streaming sequential frames of image data, to generate two or more separate streams of output (depicting the same content) at different resolutions, it is possible to generate large volumes of high-quality training data a relatively low cost, particularly when compared with some conventional systems that curate the different image pairings from static image captures. A super-resolution model trained with the training data obtained using such a modified game engine is found to give good quality super-resolution output in an efficient manner.

As noted above, and as described in more details with reference to the disclosure related to FIGS. 1-9, the disclosed embodiments include instances in which an imaging engine that is used to generate images for a software product (e.g., a video game) is modified to generate correlating training data of images rendered during runtime of that product (e.g., video game). In these instances, the imaging engine is typically not integrated into the software package containing the video game. Instead, the imaging engine may be modifiable without having to modify code used to execute the video game.

As further described below with reference to FIGS. 10-12, the disclosed embodiments also include obtaining and utilizing training data for a particular target product when the target product is packaged with an integrated imaging engine that is not easy or practical to modify for generating the training data.

Some of the disclosed embodiments, as further described below with reference to FIGS. 13-16, also include systems and methods for dynamically modifying the training of super-resolution models with training cycles that include a plurality of epochs and in which the training cycles are further augmented with validation processes and regression analysis processes to help facilitate training of the models without overfitting or underfitting the models when they are applied to particular sets of training data.

Attention will initially be directed to FIG. 1. As shown, a typical image processing flow 100 includes an image generator 110 processing image data that is fed through an image rendering pipeline of a rendering engine 120 for preparing output images configured for rendering on a display device 130 with a desired format and at a desired resolution.

The referenced image data may comprise actual images that are created by the image generators. In some instances, for example, the image generator is a gaming engine that executes a game simulation or other application execution that generates images. Additionally, or alternatively, the image generators can generate images that are rendered on a connected display device.

The rendering engine 120 may be a stand-alone software module that utilizes hardware, such as a graphics processing unit (GPU) or other hardware components. The rendering engine 120 may be integrated into the image generator (e.g., gaming engine) and/or display device and/or an intermediary system interposed between the image generator and end-user display device.

The processes performed by the rendering engine 120 may include various discrete processes for altering the attributes of the images being processed. By way of example, the image rendering pipeline of the rendering engine 120 may include image processing such as processing that modifies or applies a particular style, format, orientation, coloring, contrast, brightness, filtering, masking and/or other imaging transformation to the images being processed.

One of the imaging processes that may be performed by the rendering engine 120 is super-resolution processing performed by a super-resolution machine learning model (e.g., super-resolution model 150). The super-resolution model 150 includes algorithms, described below, which are used by the super-resolution model 150 for upscaling a low-resolution image into a high-resolution image. Super-resolution processing that is performed by the super-resolution model 150 may also include other related imaging processes, such as anti-aliasing. A list of examples of super-resolution machine learning models that may be used is: Laplacian Pyramid Super-Resolution network (LapSRN), Fast Super-Resolution Convolutional Neural Network (FSRCNN) and Efficient Sup-Pixel Convolutional Neural Network (ESPCN).

Figure 2:
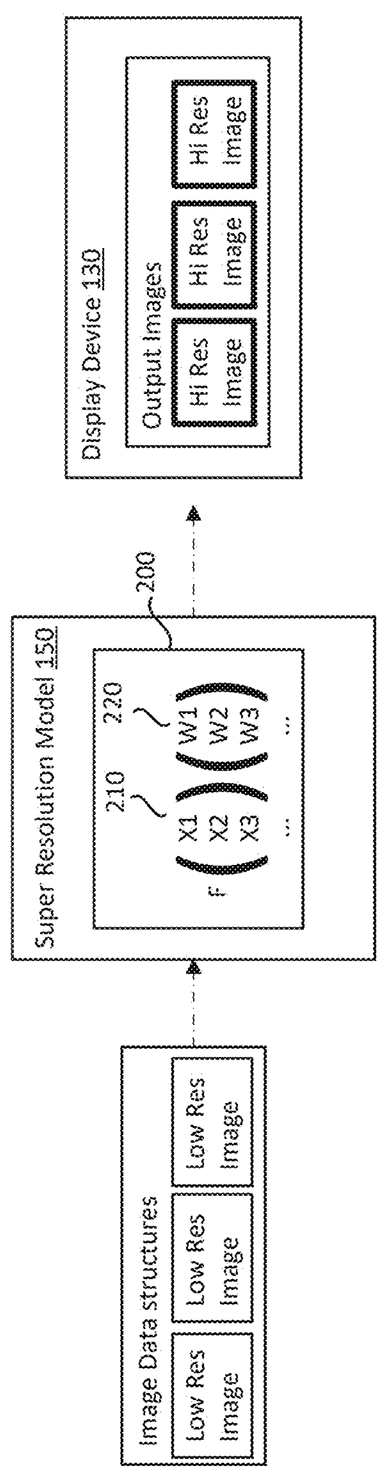
FIG. 2 illustrates an example of a super-resolution processing flow associated with a machine learning model performing super-resolution on low-resolution images to generate corresponding high-resolution images.

FIG. 2 illustrates one example of a super-resolution processing flow in which low-resolution images are upscaled into output images comprising high-resolution images, based on the low-resolution images, and which are prepared for rendering on a display device 130.

As shown, the upscaling is performed by a super-resolution model 150 that comprises a neural network of one or more algorithms 200 that use values of the image attributes and pixel properties as inputs 210 for the algorithm parameters. The neural network of the super-resolution model applies weights 220 to the various inputs 210 to control how the inputs are processed by the neural network algorithms 200. The weights 220 are modified through backpropagation, to account for error values that are detected between the super-resolution model outputs and the high-resolution images included in the training data.

Figure 3:
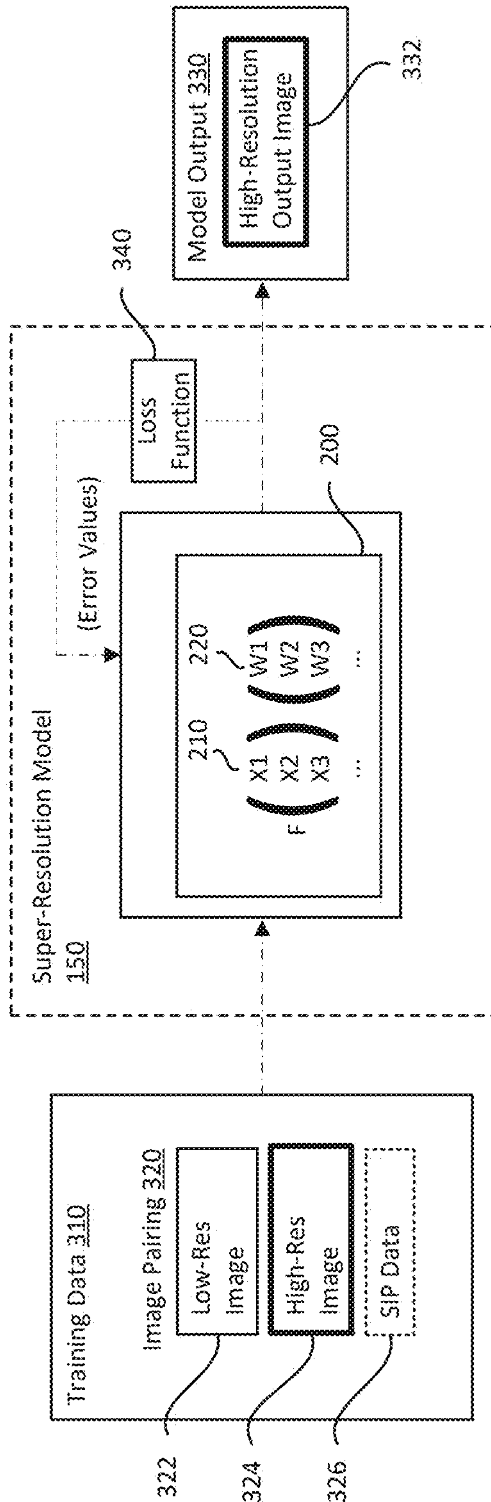
FIG. 3 illustrates an example of a super-resolution training and processing flow of a super-resolution model that is applied to training data comprising low and high-resolution image pairings.

FIG. 3 illustrates a super-resolution training and processing flow 300 in which the super-resolution model 150 is applied to training data 310. The training data includes image pairings 320 of low-resolution images (322) and high-resolution images (324) of the same content (e.g., the same scene or image frame at different resolutions). The training data may also include supplemental image processing (SIP) data 326, which will be discussed in more detail below, with reference to FIG. 7, and which can include motion vector data, jittered image data, and other supplemental information. One example of additional supplemental information includes temporal data based on a past frame history, since the value in motion vector data and jittered image data comes from the fusion of a sequence of frames to increase the spatial resolution of the output. A past frame history may be formed from either a set of multiple prior low-resolution images and associated SIP data or from one or more prior high-resolution images output from the super-resolution model.

The supplemental image processing data is available from the image generator. In some instances, the image generator comprises a video codec which processes the images generated by the image generator and, as part of the encoding, computes motion vector data, depth data, and anti-aliasing data for the images. This SIP data is used by the super-resolution model, with a low-resolution image, to generate a corresponding high-resolution image that omits aliasing and jitter artifacts that can sometimes exist in the low-resolution images due to discrete rasterization when generating the low-resolution images. By including the SIP data in the training data 310, the super-resolution model 150 is trained to compensate for aliasing effects when comparing the low-resolution image and the high-resolution image in the image pairing 320 supplied with the SIP data.

During training, the algorithms 200 of the super-resolution model 150 are applied to the training data by using the low-resolution images as inputs to the model. The weights 220 used by algorithms of the model, such as neural network weights, are then adjusted, using neural network training such as backpropagation, to account for error values that are detected between the final model output 330 and training data, such as the differences between the high-resolution output image 332 and the corresponding high-resolution image 324 from the training data image pairing 320.

The error values are generated by loss functions used by the super-resolution models to quantify and define the divergence of the pixel values in the output images generated by the model when compared to the desired/target output images associated with the training data.

During a training cycle, which may include a plurality of epochs, the weights applied to the model parameters (e.g., image attributes and properties) are modified through backpropagation to reduce the error values between model outputs and the training data.

It will be noted that the disclosed models may utilize a combination of one or more different loss functions 340 during the training cycles to accommodate different needs and preferences. In some embodiments, the super-resolution models use a non-perceptual (or per pixel) loss function, such as the L1 loss function, the L2 loss function, and/or a structural similarity (SSIM) loss function. In alternative or additional embodiments, the models use a perceptual loss function, such as the Visual Geometry Group (VGG) 19 loss function or another perceptual loss function, such as another VGG loss function or a convolutional neural network loss function.

The models may also use a combination of the different types of loss functions that generate the error values in the same or different cycles of the training, where each cycle may include one or more epochs. For instance, a first loss function may be used during a first epoch of the training data and a second loss function may be used during a subsequent epoch of the training data, in a same or different training cycle. A common loss function utilizing different weighting may also be used during different epochs of the training data.

Additional details regarding the training processes will be provided below in reference to FIGS. 13-16.

Figure 4:
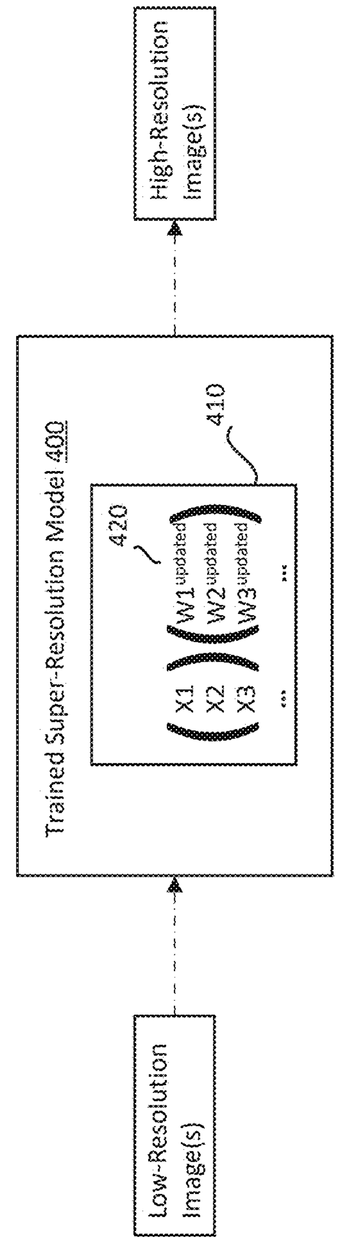
FIG. 4 illustrates an example of a super-resolution processing flow associated with a trained machine learning model performing super-resolution on low-resolution images to generate corresponding high-resolution images.

As a result of the training, the super-resolution model 150 becomes a trained super-resolution model 400, as shown in FIG. 4, with updated weights 420 that cause the trained super-resolution model 400 to perform at an increased level of performance relative to the untrained super-resolution model 150, meaning the high-resolution images are generated more accurately to a desired, target output from the low-resolution images than was possible with the untrained super-resolution model 150. Said another way, the trained super-resolution model 400 has achieved a greater level of convergence associated with the output generated by the trained super-resolution model 400 than the output generated by the untrained super-resolution model 150, when compared to a desired target output.

As noted earlier, one problem with training super-resolution models is obtaining sufficient training data for the different end-use scenarios that a model may be applied to. Some systems for obtaining training data include the creation of two images at different resolutions by taking a first image and then upscaling that image into a second image and then pairing those images together as training data. However, this can be a very time-intensive process.

To help address the foregoing problem, the disclosed systems and techniques include the modification of existing image generators, such as gaming engines, to automatically generate pairs of images at different resolutions.

There are many different types of gaming engines, such as, for example, Unreal Engine™, Amazon Lumberyard™, CryEngine™, Unity, GameMaker: Studio, Incredibuild, and so forth. To generate the images the gaming engine may have a complex 3D mesh model or other model of a scene and objects in the scene. The gaming engine has to render from the complex 3D mesh model to compute the images which is a resource intensive task.

Currently, no conventional gaming engine is being used to generate image training data sets for training super-resolution models to perform upscaling in the manner described herein. In particular, no conventional gaming engine is currently used for generating two (or more) sets of images at different resolutions for each frame of a plurality of different frames processed by or generated by the gaming engine and which are paired into image pairings for training data to train a super-resolution model. Other types of rendering engines, beyond gaming engines, have also not been used to generate two sets of images at different resolutions for each frame of a plurality of different frames processed by or generated by the rendering engine and which are paired into image pairings for training data to train a super-resolution model. Instead, conventional gaming engines, and other similar image generators, are configured to merely output images at only a single resolution at a time. While conventional image generators enable a user to select a desired output resolution from multiple different possible output resolutions, they do not enable a user to select multiple different output resolutions to generate, and particularly not for outputting different resolutions of the images having the same or similar content simultaneously. Conventional gaming engines are configured to only output one resolution of images at a time, with the output images being rendered on a display during game generation or simulation, for example. However, by modifying the code of the gaming engines to output to two (or more) different outputs at a time, it is possible to cause the gaming engines to simultaneously output one image at a first resolution and a second image at a second resolution for any selected frame of the image content that is being generated or processed by the gaming engine. Because the images are generated from the same frame they depict the same content, but at different resolutions.

The term gaming engine is a term of art for a type of application that provides many functions related to the generation of games, including animations, physics simulations, audio integration, application interfacing, and image processing. Most gaming engines include or interface with a rendering engine that is configured to process image data (e.g., geometry, viewpoint, texture, lighting, shading, coloring) for generating visualizations or output images corresponding to the image data. For at least this reason, this disclosure will broadly use the term image generator to refer to a gaming engine, rendering engine, or any other application that is configured to generate images from underlying models. In particular, a rendering engine is an application that generates images from 2D or 3D models configured as scene files containing objects in a strictly defined computer language or data structure. The rendering engine creates image structures from the models and formats the structures as visualizations for rendering on a display. The term "image structure" is used to refer to an image, which can also be defined as a file that stores image data that is rendered into a displayed image by an image viewer. Some rendering engines are integrated into larger software applications, such as gaming engines, which are configured to not only create the visualizations from the underlying objects and models but to also create and generate the underlying objects and models. During runtime, the gaming engine also generates animations of output images that are related to gameplay in response to user interactions within a game that is being executed by the gaming engine.

During the generation and simulation of a game or other application by an image generator, images will be generated and output as a plurality of discrete frames in a sequential stream of frames for rendering at a desired framerate (e.g., at a 30 frames per second (FPS)-60 FPS rate). For example, during the runtime of a game, a rendering engine can be used to generate output images that are rendered as animations of the gameplay on a display device. The resolution and framerate in which the images are rendered will be based on the particular resolution and capabilities associated with the display device, as well as the output settings of the rendering engine.

Figure 5:
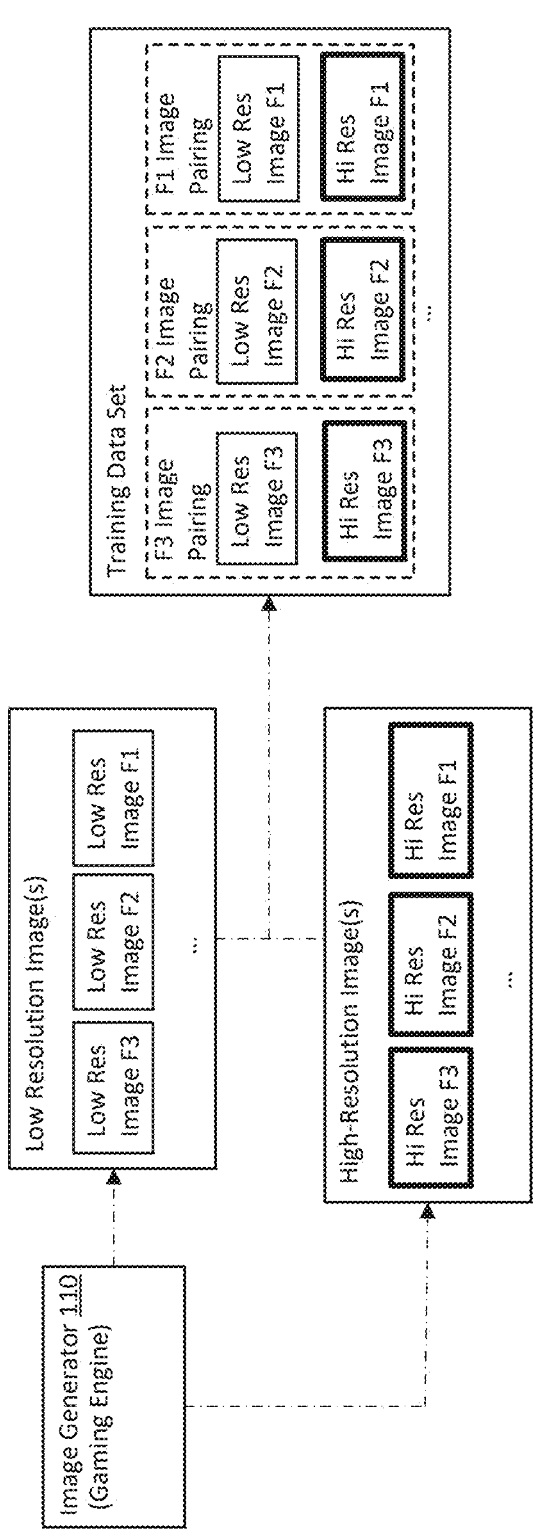
FIG. 5 illustrates an example of a processing flow associated with generating training data sets comprising low and high-resolution image pairings, wherein the high and low-resolution images of the image pairings are generated substantially simultaneously by an image generator.

Attention is now directed to FIG. 5. This illustration shows a training data set generation processing flow 500 in which an image generator 110 (such as a gaming engine) is modified to substantially simultaneously generate two sets of images, including a first set of images at a low-resolution and a second set of images at a high-resolution for each frame of a plurality of frames. The first set of images is generated at a first resolution which is lower than a second resolution. The second set of images is generated at the second resolution. For example, as shown, the image generator 110 generates low-resolution images that include a different low-resolution image for a plurality of frames (e.g., Low-Res Image F1 for frame 1, Low-Res Image F2 for frame 2, Low-Res Image (F3) for frame 3), as well as a different high-resolution image for the same plurality of frames (e.g., High-Res Image F1 for frame 1, High-Res Image F2 for frame 2, High-Res Image (F3) for frame 3).

The system interfacing with or including the image generator 110 is also used to pair the different images together into one or more training data sets of image pairings for training a super-resolution model.

The image pairings of the training data set(s), as previously described, include a low-resolution image and a corresponding high-resolution image pairing for a common frame of image data. By way of example, the illustrated training data set includes an F1 image pairing of the Low-Res Image F1 for frame 1 and the corresponding High-Res Image F1 for frame 1 that were substantially simultaneously generated by the image generator 110. The training data set also includes a plurality of additional image pairings for different frames that are selected from a plurality of sequential frames in a stream of frames being generated by or processed by the image generator.

In some instances, the training data set includes hundreds or thousands or tens of thousands of image pairings to accommodate different needs and preferences for training data sets. It has been found that thousands or tens of thousands of image pairings in a dataset may be sufficient to train a super-resolution model to a desired threshold of convergence. However, the scope of the disclosure is not limited to any particular quantity of image pairings that can be included in a training data set. For instance, it is also possible to generate a training data set of hundreds of thousands of image pairings using the disclosed techniques.

The code of the image generator 110 can be modified to enable the simultaneous generation of the images at different resolutions. New image generators can also be built with the functionality to simultaneously generate images at different resolutions.

With regard to the foregoing, it is noted that the terms low-resolution and high-resolution are relative, such that any resolutions can be used for the different image sets, as long as the resolutions of the image sets are different, with one resolution being higher than the other. In some instances, the low-resolution image set comprises a 2 k resolution (i.e., 1920×1080 pixel resolution), or lower, and the high-resolution image set comprises a 4 k resolution (i.e., 3840×2160 pixel resolution), or even a higher resolution, such as an 8 k resolution.

It will also be appreciated that some super-resolution models are trained to target more than just a single input resolution during inference. By way of example, some models may be created to handle a range of input resolutions and/or for generating multiple output resolutions. This can be particularly beneficial for games that utilize different resolutions at runtime and which may employ dynamic resolution scaling techniques. A game may employ dynamic resolution scaling to adjust its render resolution dynamically based on the GPU load in the scene (e.g., when the GPU is struggling to maintain a given target framerate, such that its resolution will be lowered to reduce the pressure and avoid frame drops).

To train such models, multiple relatively lower-resolution frames are captured for a frame in a correlated manner, and these frames are grouped with their high-resolution ground truth counterparts. So instead of only a correlated pairing, the training processes described herein may produce and consume a correlated plurality of frames that are paired into tuples or other groupings of correlated images for each time step in the training process.

Figure 6:
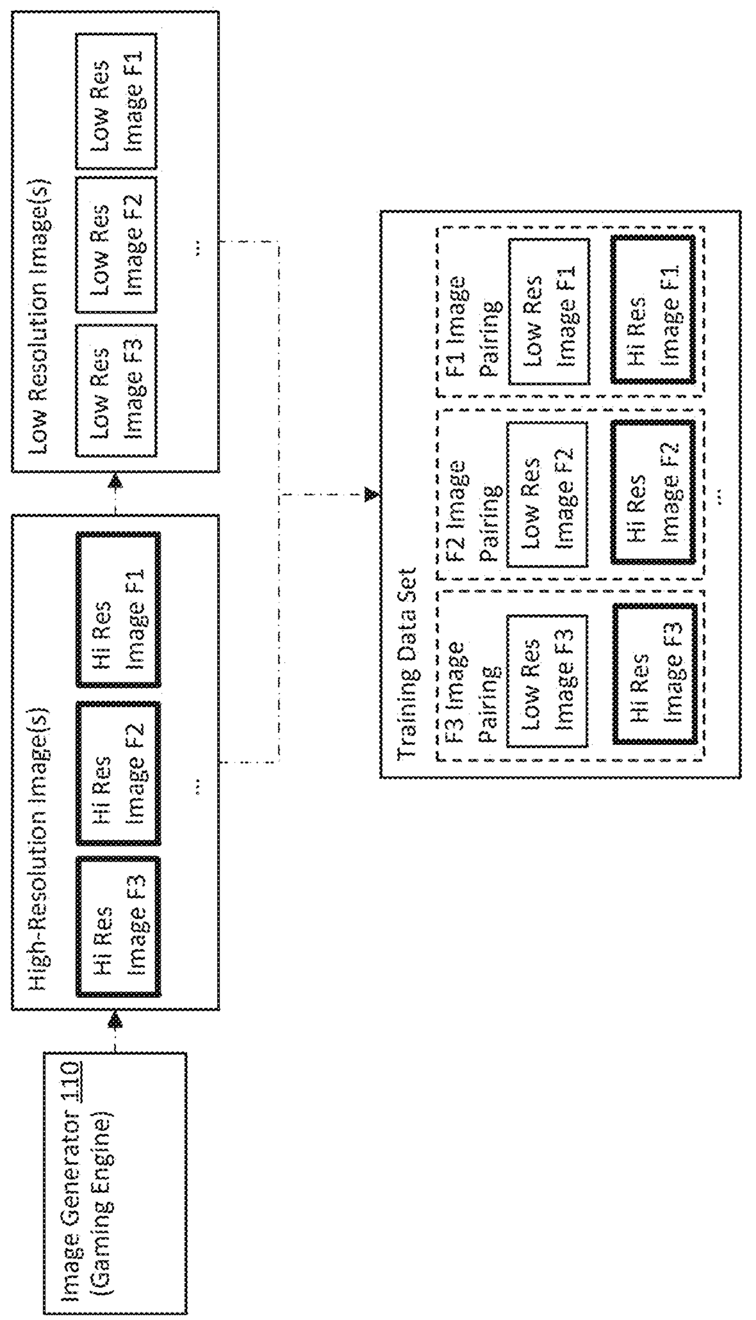
FIG. 6 illustrates an example of a processing flow associated with generating training data sets comprising low and high-resolution image pairings, wherein the high and low-resolution images of the image pairings are generated in series by an image generator.

Attention is now directed to the training data set generation flow 600 of FIG. 6. This flow is enabled by embodiments in which the image generator 110 is capable of operating in a special rendering mode in which the image generator 110 generates correlating frames for different instantiations of a gameplay scene or a repeated simulation at different resolutions, such that frames of the subsequent runs can be correlated or otherwise matched at their different resolutions. This may also include generating different frames from different perspectives of the scene.

In this example, the image generator 110 is configured to generate two different sets of images at different resolutions or different image style attributes asynchronously, in series. For example, the image generator 110 can generate a first set of low-resolution images for a plurality of frames during a first run and prior to generating a corresponding second set of high-resolution images for the same plurality of frames during a subsequent execution or simulation of the gameplay. Alternatively, although not shown, the image generator 110 can also generate the set of low-resolution images subsequent to generating the set of high-resolution images.

Regardless of which image data set is generated first, the system interfacing with or incorporating the image generator 110 will pair up the correlating high and low image resolution images for each common frame that is generated by the image generator 110 into the different image pairings of the training data set. For example, the illustrated training data set includes a plurality of image pairings of low and high-resolution images corresponding to common frames.

The pairing of the images can include creating new files or other data structures that include both images, depicting the same content at different resolutions, in a single storage location. Alternatively, image pairing may be a pointer data structure that simply references the two images that are handled and stored separately.

Figure 7:
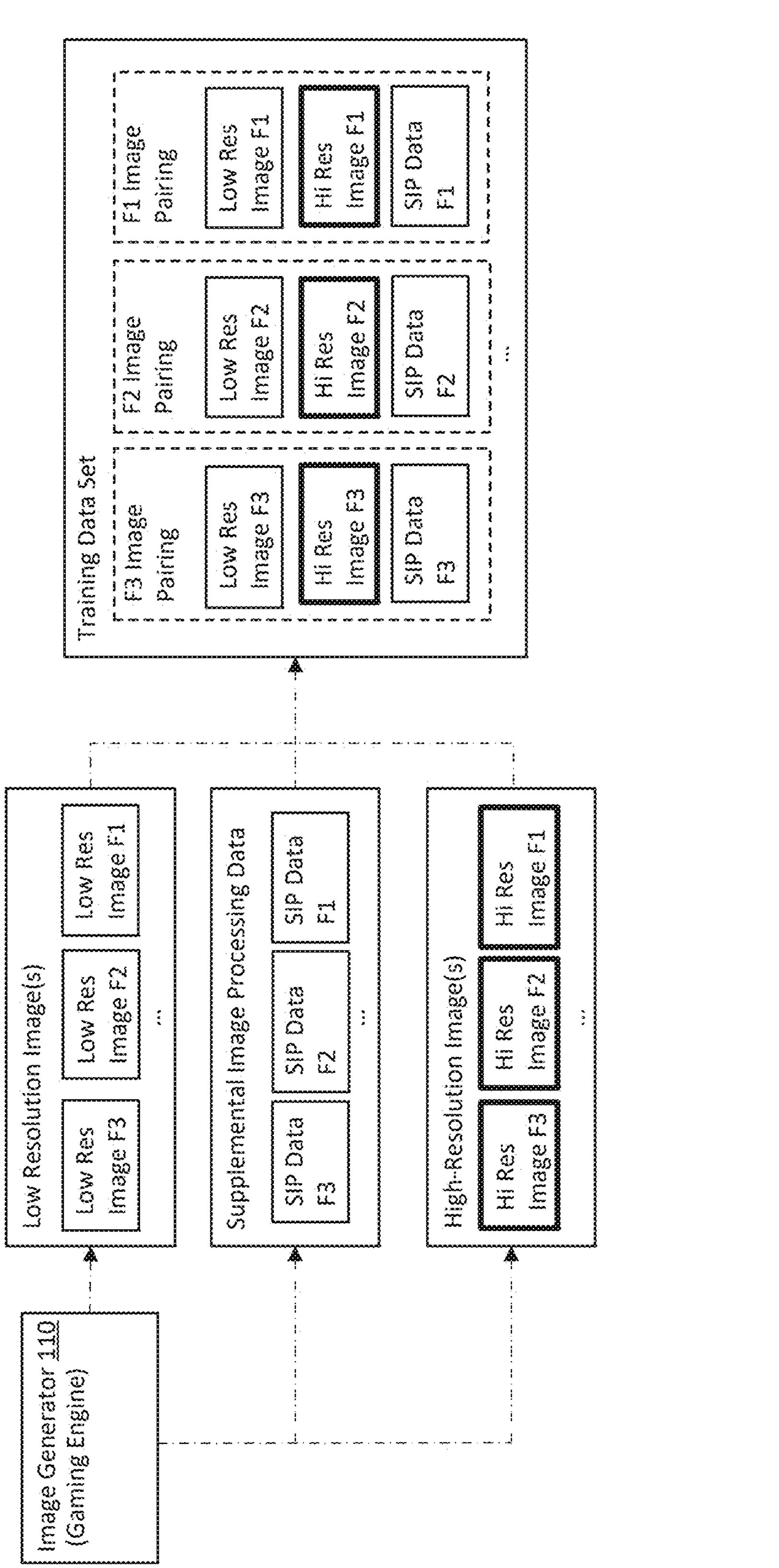
FIG. 7 illustrates an example of a processing flow associated with generating training data sets comprising low and high-resolution image pairings, as well as supplemental image processing data.

Attention is now directed to the training data set generation flow 700 of FIG. 7. This embodiment illustrates how the different training data set image pairings can also be augmented or supplemented with additional imaging data. For example, as shown, the image generator 110 generates supplemental image processing data for one or more of the image frames that are processed and used for the image pairings (e.g., SIP Data F1 for frame 1, SIP Data F2 for frame 2, SIP Data F3 for frame 3, etc.).

The supplemental image processing data that is generated and supplemented with the image pairings can include any image processing data that is usable by a super-resolution model during inference, and which is used while processing the inputs entered as the parameters of the model algorithms. Then, when the model is subsequently used for performing super-resolution processing on low-resolution images to generate high-resolution images, the model can perform the processing with similar supplemental image processing data to obtain final images having a desired quality. By way of example, the supplemental image processing data may include motion vector data, jittered image data, and/or depth data corresponding to the rendering of the low-resolution image set.

The supplemental image processing data may be included as metadata for the lower resolution image, for example, or provided as a separate data file that is referenced by and linked to by the image pairings.

The supplemental image processing data is used by the image generator, in some instances, to modify how the output images are generated. By way of example, MIP bias levels can be set and used with sub-pixel jitter to produce the low-resolution images that comprise sparse sampling of the corresponding higher-resolution images. The MIP biasing increases texture resolution of the image, but at the expense of under-sampling the image data. To compensate, a grouping of sequential under-sampled lower-resolution images can be selected and grouped based on the jitter to spatially align contiguous temporal sequences of frames to reconstruct high-resolution frames with full texture detail. In particular, the grouped low-resolution images can then be used with the training data pairings to a corresponding high-resolution image to train the model to reconstruct high-resolution images with full texture detail corresponding to the grouped low-resolution images that comprise sparse samples. While mipmaps or MIP maps are sequences of progressively lower resolution representations of previous images, the MIP bias levels are used to interpolate the texturing differences between different resolution images and can be applied to different algorithms used by the image generator to perform the interpolation.

Other supplemental image processing data that can be used includes anti-aliasing parameters. Anti-aliasing parameters are available from the image generator such as the gaming engine. Antialiasing parameters can be used when performing antialiasing processes, for example, when generating high-resolution outputs that utilize one type of anti-aliasing (e.g., MSAA—Multisample Anti-Aliasing) that better match the anti-aliasing used when generating the expected low-resolution inputs (e.g., FXAA—Fast Approximate Anti-Aliasing). With this training, the model learns to associate, and improve input images generated from a game with less effective game antialiasing with the higher-resolution output based on more effective antialiasing. In this manner, the model can become more adept at smoothing out edges in the high-resolution images.

By way of another example, post-processing effect data, which can be used to perform post-processing (e.g. motion blur) may be included in the generation of both low-resolution and high-resolution outputs. Post-processing effect data is available from image generators such as the gaming engine. In some instances, the system is trained on training data sets that include supplemental post-processing instructions for performing the post-processing (e.g., motion blur) on output high-resolution images after the super-resolution processes have already been performed and to obtain the high-resolution image that includes attributes of the post-processing (e.g., motion blur). In this regard, it will be appreciated that the image generator and super-resolution model can be modified to apply the post-processing effects during inference or after the super-resolution has already been performed. That said, during the training of the model, it has been found that it is better (i.e. produces a better performing model) to train on non-blurred images (without applying the post-processing effects during inferencing) and to apply blurring (with the post-processing effect data) after the super-resolution processing has been performed.

Figure 8:
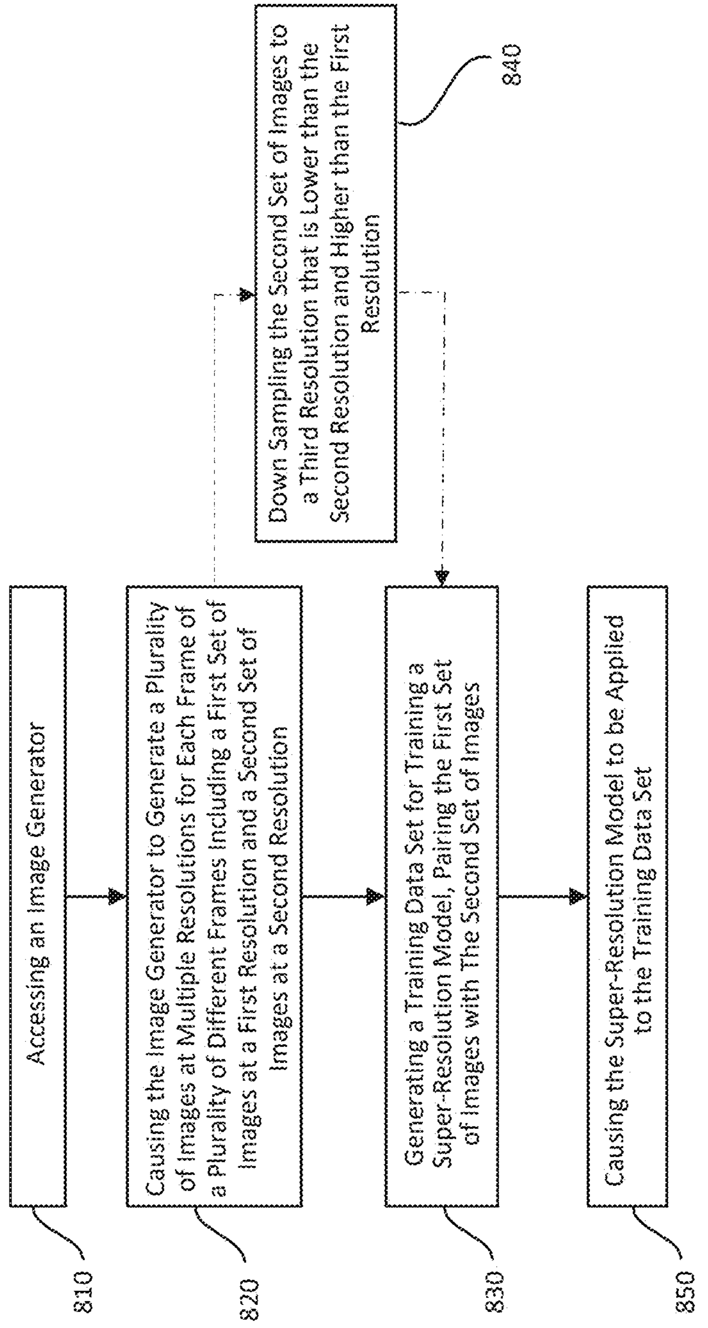
FIG. 8 illustrates an example of a flow diagram of acts associated with methods for generating training data sets and for applying super-resolution models to the training data sets.

Attention is now directed to FIG. 8, which illustrates a flow diagram 800 of a plurality of acts associated with methods for generating and using a super-resolution training data set of image pairings obtained from an image generator such as a gaming engine. The illustrated acts are implemented by a computing system having a processor and storage that stores computer-executable instructions that are executable by the processor to implement the functionality of the referenced acts.

The first illustrated act includes the computing system accessing an image generator (act 810), such as a gaming engine or another type of image generator that is configured to generate images, such as by rendering from a 3D model, and that outputs the generated images in a stream of sequential frames at a resolution. The image generator may be integrated into a part of the computing system or, alternatively, remotely accessed by the computing system.

The next act (act 820) includes the computing system causing the image generator to generate a plurality of images at multiple resolutions for each frame of a plurality of different frames from a stream of sequential frames, including a first set of images at a first resolution and a second set of images at a second resolution that is a relatively higher resolution than the first resolution. This may be accomplished by modifying the code of the image generator and/or by building a new image generator to process image data and generate the referenced output image sets at different resolutions.

In some instances, act 820 is implemented by causing the image generator to generate the first image(s) of the first image set and the corresponding second image(s) of the second image set simultaneously. In alternative embodiments, upon determining that the image generator can support a special rendering mode in which the image generator guarantees exact replication of frames for subsequent runs of gameplay or a simulation at different resolutions, such that frames of the subsequent runs can be exactly matched at their different resolution, the system may cause the image generator to generate the different image sets at the different resolutions asynchronously. To determine whether the image generator supports the special rendering mode, tests may be executed automatically. In some cases, to determine whether the image generator supports the special rendering mode, an operating system of a computing device executing the image generator is queried.

The different resolutions of the first and second image sets can be any resolution, wherein the second resolution is higher than the first resolution. In some embodiments, the first or second resolution is a resolution of 640×480 pixels, 1280×720 pixels, 1920×1080 pixels, 3840×2160 pixels (4 k), 7680×4320 pixels (8 k), or another resolution. It will be appreciated, however, that these are only a few examples of different resolutions that could be used, as there are almost infinite resolutions that could be used in the disclosed embodiments.

Next, the system generates a training data set for training a super-resolution model (act 830) by pairing the first and second image sets into unique image pairings in which each unique image pairing in the training data set comprises (i) a first image of a unique frame of the plurality of frames at the first resolution and (ii) a corresponding second image of the unique frame at a second resolution that is higher than the first resolution.

In some instances, this includes supplementing the training data set with supplemental image processing data associated with rendering the first set of images (i.e., the low-resolution images) corresponding to the plurality of different frames. This supplemental image processing data may be used as inputs for the super-resolution model image processing algorithms. The supplemental image processing data may comprise, for example, motion vector data corresponding to the rendering of the low-resolution images, jittered image data corresponding to the rendering images and/or depth data corresponding to the rendering of the low-resolution images.

Additionally, the system may optionally down sample the second set of images (i.e., the high-resolution images) from the second resolution to a third resolution that is a relatively higher resolution than the first resolution and prior to pairing the first set of images with the second set of images into the unique image pairings of training data (act 840). In such scenarios, for example, each unique image pairing in the training data set will comprise (i) the first image of the unique frame of the plurality of frames at the first resolution and (ii) the corresponding second image of the unique frame at the third resolution that is higher than the first resolution but which is lower than the second resolution.

This optional implementation of generating a high-resolution image that is down-sampled to a target resolution can be a particularly useful optimization to further expedite the training of the super-resolution models by providing training data that includes target high-resolution images that can be used to drive the super-resolution models to a desired threshold of convergence more quickly, as the down sampled high-resolution images more closely resemble the desired target outputs of the super-resolution models. When the models are applied to the training data set, they will modify the weights of the algorithms more appropriately to generate desired target outputs based on the low-resolution and supplemental image processing data inputs. In these instances, the second resolution may be at least double the third resolution (e.g., 8 k vs 4 k) and/or at least double the first resolution.

The final illustrated act (act 850) includes causing the super-resolution model to be applied to the training data set. As noted above, the super-resolution model comprises a neural network having weights that are applied to parameters of the model algorithms. The parameters used by the model algorithms are the input values of the low-resolution images (e.g., pixel intensity, pixel color, and pixel density, etc.). The weights applied to the parameters cause different values to have a more or less significant impact in the output values that are calculated by the model algorithms while upscaling images from a first resolution to a second resolution. Application of the training data set to the super-resolution model causes the super-resolution model to modify the weights based on differences between (i) the second image of each image pairing in the training data set with (ii) an upscaled output image of the corresponding first image of each image pairing in the training data set that is generated by the super-resolution model applying the image processing algorithms to the first image of each image pairing and, optionally, supplemental image processing data of the training data (if any).

This process will continue on a gradient decent, in some instances, until the model reaches a desired threshold of convergence between the model outputs (e.g., high-resolution outputs generated by upscaling the low-resolution images of the training data set image pairings) and the target model outputs (e.g., the high-resolution images of the training data set image pairings). Even more particularly, the desired threshold of convergence may be a predetermined value of deviation (e.g., less than 0.1%, less than 0.2%, less than 1%, less than 5% deviation) between measured image attributes in the model outputs and the target model outputs, such as may be measured by a comparison of PSNR (Peak Signal-to-Noise Ratio), MS-SSIM (Multi-scale Structural Similarity for Image Quality Assessment), or any other objective scale.

Figure 9:
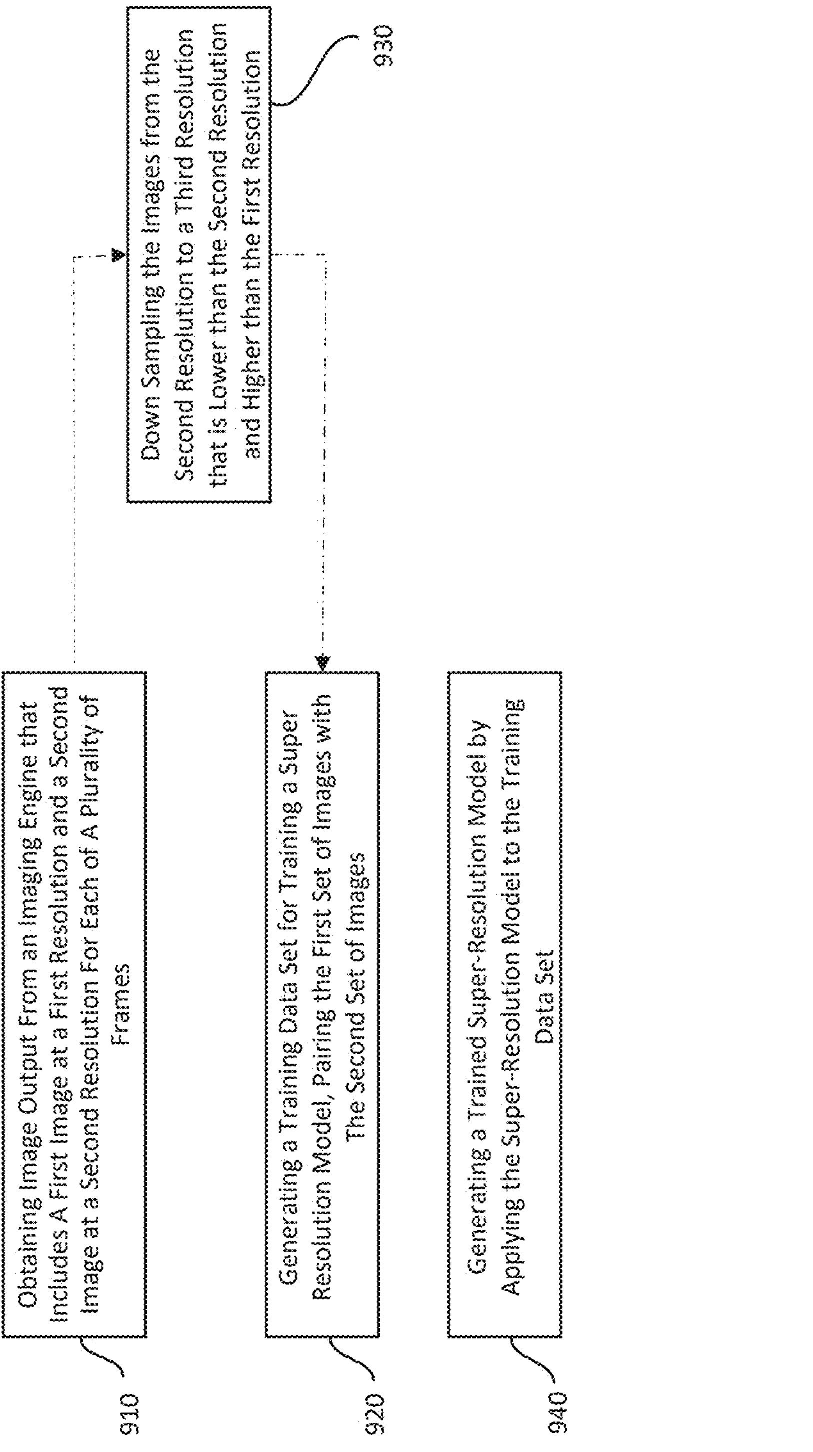
FIG. 9 illustrates an example of a flow diagram of acts associated with methods for generating training data sets and for generating trained super-resolution models by applying super-resolution models to the training data sets.

Attention is now directed to FIG. 9, which illustrates another flow diagram 900 that includes acts associated with methods for generating super-resolution training data and for generating a trained super-resolution model with the training data.

The acts of flow diagram 900 are implemented by a computing system having a processor and storage that stores computer-executable instructions that are executable by the processor to implement the functionality of the referenced acts.

The first illustrated act includes obtaining image output from an imaging engine (e.g., a gaming engine) that generates image output from processing image data (act 910) such as by rendering from a 3D model. As indicated above, the image output that is obtained comprises a first image at a first resolution and a second image at a second resolution for each frame from a set of frames selected from a sequential series of frames of the image data, wherein the second resolution is a higher resolution than the first resolution. This act may be performed similarly to the performance of acts 810 and 820, described above.

Next, the system generates a training data set for training a super-resolution model to generate upscaled images at the second resolution from input images at the first resolution by pairing the first image with the second image of each frame from the set of frames (act 920). This act may be performed similarly to the performance of act 830, described above. This may include, for example, processes for down sampling super high-resolution images (act 930), similar to act 840, described above.

Finally, the system generates a trained super-resolution model by applying the super-resolution model to the training data set (act 940). As mentioned previously, the weights of image processing algorithms are modified during training through backpropagation based on differences that are detected between (i) the target model outputs (e.g., the high-resolution image of each image pairing in the training data set with (ii) the actual model outputs (e.g., the corresponding upscaled output images generated from the low-resolution images in the training data set).

Notably, the super-resolution model is preferably trained with training data that corresponds to the specific styles of the images that the model is processing. Otherwise, the high-resolution images output by the super-resolution model will not converge with the desired output. For instance, if the model is trained on training data comprising pairs of low-resolution animation images at 1 k (960×540 pixel resolution) and correlating high-resolution animation images at 2 k (1920×1080 pixel resolution), that model will likely not be well-configured to generate photo-realistic high-resolution images at 4 k (3840×2160 pixel resolution) based on photo-realistic images at a lower-resolution of 2 k. Accordingly, to train a model to generate high-resolution images of a particular style from lower-resolution images of the same style or a different style during runtime, it is desirable to obtain training data that includes correlating matches of images having the same resolutions and styles that will be processed during runtime. The term "style" of an image is used to refer to characteristics of content depicted in an image such as texture, color, and motion of an image. More detail about style of an image is given below.

Using the techniques described above, it is sometimes possible to obtain such training data for a video game or other target product that is associated with images of a particular style by modifying an image generator that is used to generate images for the target product (e.g., video game) to utilize multiple output viewports (e.g., rendering targets) to generate low-resolution images along with correlating higher-resolution images of the target product (e.g., video game) during runtime.

Unfortunately, in some instances, such as when the video game is integrally packaged with the image generator, it can be very difficult or computationally prohibitive to modify the code of the image generator. It may also be difficult or prohibitive to use a separate image generator that could otherwise be modified to execute with the target product to generate correlating training pair images, as the target product may be locked or configured to execute with only the integrated image generator that it is packaged with. In these instances, it may not be possible to obtain training data directly from the target product. Because of this, it can be difficult to train a super-resolution model to generate high-resolution images having the unique style of the target product.

The following disclosure describes embodiments for obtaining and utilizing training data for training a super-resolution model to generate high-resolution images for a target product, based on the style of the target product images, even when it is not possible to modify an image generator to generate correlating images directly from the target product during execution of the target product.

Figure 10:
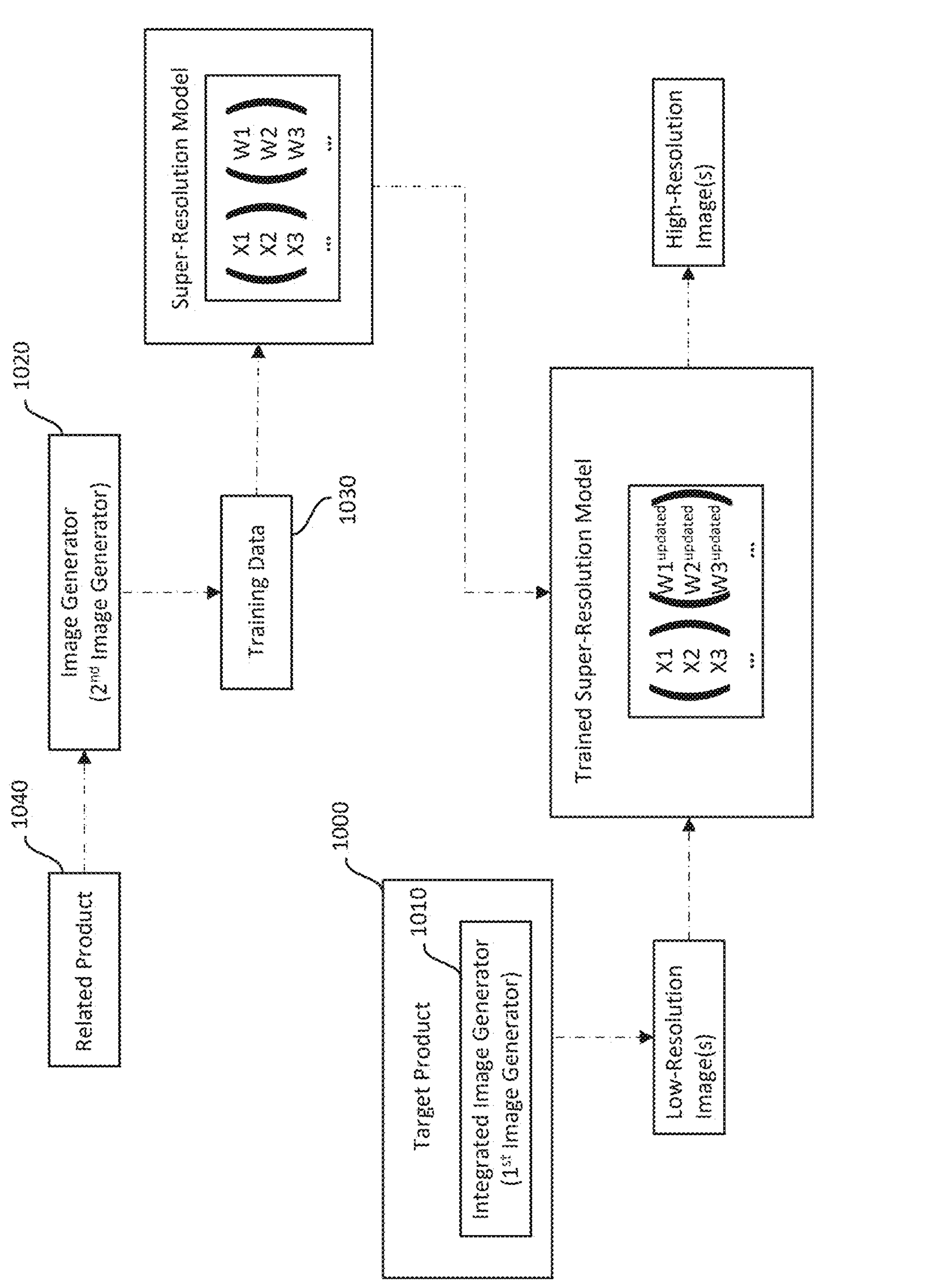
FIG. 10 illustrates an example of a processing flow associated with generating and utilizing training data sets.
Figure 11:
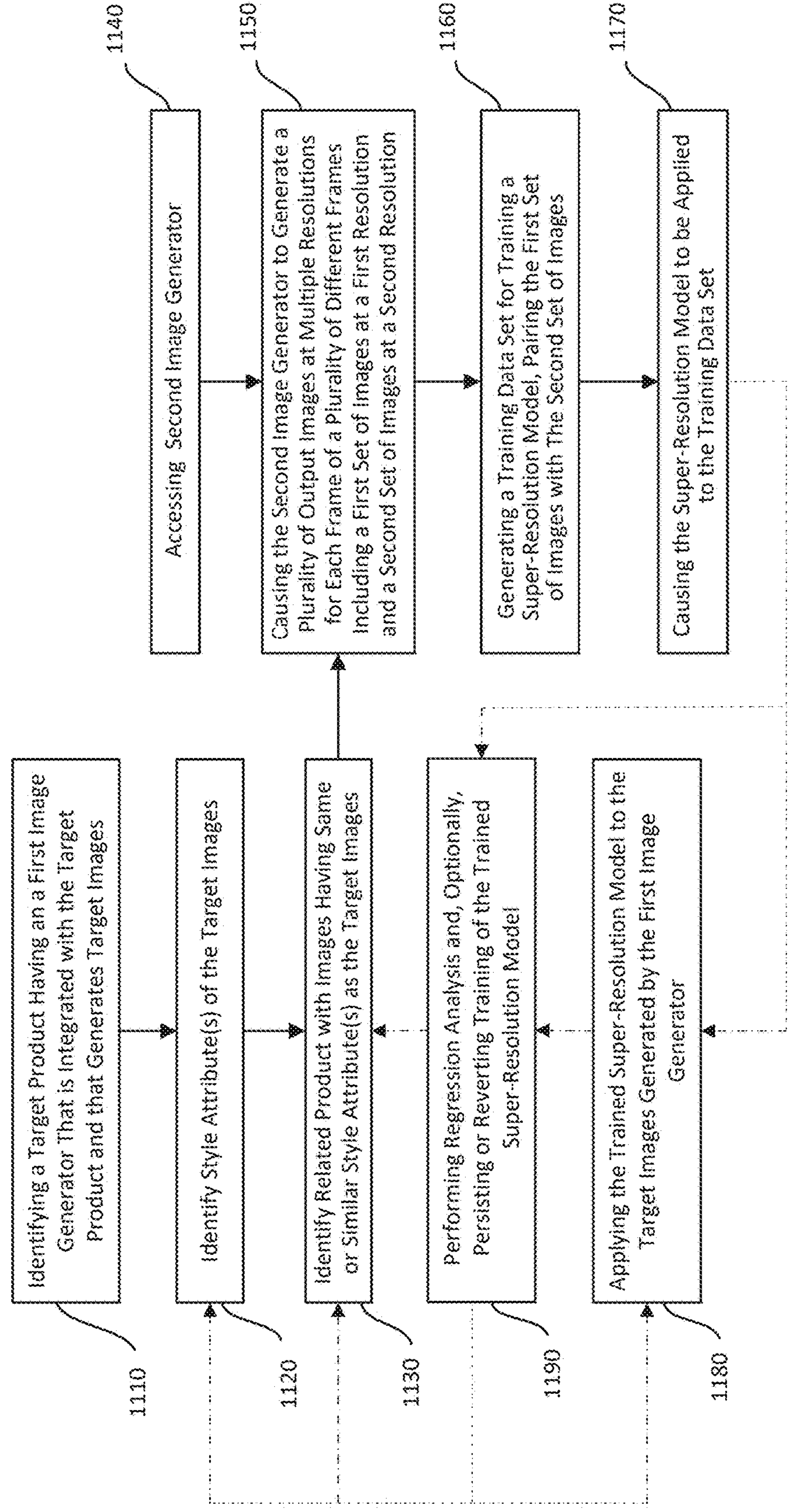
FIG. 11 illustrates an example of a flow diagram of acts associated with methods for generating training data sets and for generating trained super-resolution models by applying super-resolution models to the training data sets.
Figure 12:
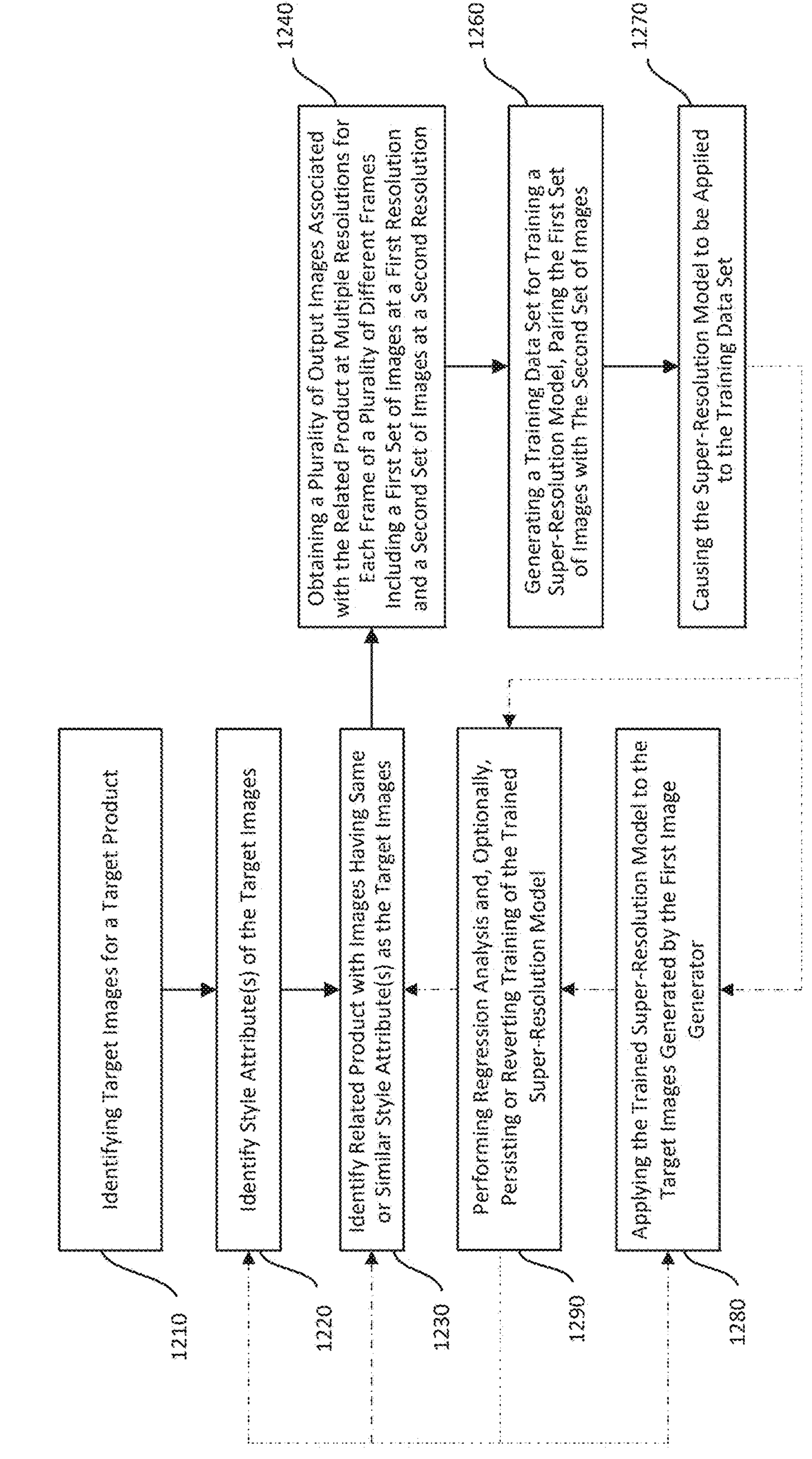
FIG. 12 illustrates another example of a flow diagram of acts associated with methods for generating training data sets and for generating trained super-resolution models by applying super-resolution models to the training data sets.

As described in the disclosure related to FIGS. 10-12, some embodiments include utilizing a second image generator that is distinct from the image generator that is packaged with an integral with the target product. The second image generator is used to obtain correlating image pairings of low-resolution and high-resolution images of a product which is related to the target product since it has images of a similar or same style as the images of the target product. In these embodiments, the image pairings generated from the related product by the second image generator are used for training a super-resolution model to generate high-resolution images for a target product based on low-resolution images of the target product having a particular style during the execution of the target product by the first image generator.

The particular style of the images that are associated with target product that affect the presentation of the images during runtime can be referred to as style attributes. These style attributes affect the look and presentation of the images and include such things as color, texture, size, or font of text presented in the images, a type of anti-aliasing technique used to process the images (e.g., super sample anti-aliasing (SSAA), multi-sample anti-aliasing (MSAA), fast approximate anti-aliasing (FXAA), temporal anti-aliasing (TAA), subpixel morphological anti-aliasing (SMAA)), shading, lighting, physically-based rendering (PBR), dynamic range, depth of field, motion blur, ambient occlusion, or color grading. Additional style attributes can also include such things as artistic styles (e.g., cartoon, pixilated, non-pixilated, realism, expressive, classical, conceptual, contemporary, cubism, surrealism, minimalism, baroque, renaissance, an artists' personalized style, etc.).

When training a super-resolution model for performing super-resolution processing of low-resolution images generated during runtime of a target product to higher-resolution images, it is desirable to use training data of correlating image pairings having the same or similar style attributes as the images that will be processed for the target product during runtime.

Accordingly, it is desirable to identify sources of images having the same or similar style attributes as the target product images. Such sources can be referred to herein as related products inasmuch as they can be used to generate the same or similar style of images during runtime as the target product. Once related products are identified, they can be used with a modified image generator to generate correlating low-resolution and high-resolution image pairings (as generally described in reference to FIGS. 5-9) for creating and utilizing training data for training a super-resolution model to generate high-resolution images based on the same style of images as the lower-resolution target product images that are generated during runtime.

FIG. 10 illustrates an embodiment in which a target product 1000 is integrated with a first image generator 1010 (e.g., a gaming engine such as Unreal Engine™, Amazon Lumberyard™, CryEngine™, Unity, GameMaker: Studio, Incredibuild, or another gaming engine). The integrated image generator 1010 of the target product 1000 generates images of the target product at a first or low-resolution with a particular set of style attributes. As noted earlier, the style attributes can include any combination of resolution, framerate, color, texture, size, text font, anti-aliasing, shading, lighting, PBR, dynamic range, depth of field, motion blur, ambient occlusion, color grading, or artistic style.

In some instances, an image or video analyzer processes images of the target product that are generated by the first image generator to identify the style attributes of the target product. Additionally, or alternatively, a machine-learning image style identification model that is trained to identify image style attributes is applied to the target product images to identify the image style attributes of the target product. The identification of the style attributes may comprise identifying labels for different style attributes that are present within images of target product, as well as quantifying values for those style attributes (e.g., a percentage or degree in which the style attribute is determined to be present or applied within the image).

The image analyzer(s) and image style identification model(s) can also be used to identify the style attributes of the images of other related products (e.g., video games) that have the same or similar style attributes. This can be done, for example, by applying images of a plurality of different products to the image analyzer(s) and image style identification model(s) to identify images and corresponding related products that have the same set of one or more style attributes as the target product.

In some instances, the system will examine the style attributes of a plurality of different products to identify a related product that is determined to have the highest correlation of the same or similar style attributes as the target product relative to style attributes of other products that are examined in the plurality of different products.

The foregoing examples illustrate how a system can utilize a video analyzer to facilitate the identification and correlation of style attributes between the images of the target product and the images of related products (e.g., video games) that have the same or similar style attributes. It will also be appreciated that such identification and correlation can also be performed by a human and visual inspection to identify images that appear to the human to be similar. Identification processes can also be performed by a combination of human(s) and the referenced system components (e.g., image analyzer).

FIG. 10 also illustrates how a second image generator 1020 is separate from the first image generator 1010 is used to generate training data 1030 based on images of a related product 1040 for training super-resolution model that can be used as a trained super-resolution model to generate high-resolution image(s) for a target product based on the low-resolution images that are generated by the first image generator 1010 integrated with the target product during runtime.

In these embodiments, the second image generator 1020 is modified to generate the correlating images of training data, as described in reference to FIGS. 5-9, but wherein the image pairings are based on the related product images that have the same or similar style as the images of the target product.

FIG. 11 illustrates a flow diagram 1100 of a plurality of acts associated with methods for generating and using super-resolution training data to train a super-resolution model for processing images of a target product, wherein the training data is obtained from a modified image generator processing images of a related product having images that are of a same or similar style as the target product. One or more of the illustrated acts are implemented by a computing system having a processor and storage that stores computer-executable instructions that are executable by the processor to implement the functionality of the referenced acts.

The first illustrated act includes identifying a target product that is used during runtime to generate target images at a first resolution and for which the super-resolution model is to be trained to render corresponding images at the second resolution, the target product being integrated with a first image generator that generates the target images for the target product at the first resolution during runtime of the target product (act 1110).

Next, the style attributes of the target images (act 1120) are identified. This can be done using a video or image analyzer, as mentioned above. This can be done using a machine-learning model trained to identify image attributes, as described above.

Next, the methods include evaluating a plurality of sample products to identify a related product comprising a training source product that is configured for use by a second image generator to generate output images at the first resolution with style attributes that are the same as or at least similar to the style attributes of the target product (act 1130).

Next, the methods include accessing an image generator (act 1140), such as a gaming engine or another type of image generator that is configured to generate images for the related product by processing image data of the related product and that outputs the generated images with style attributes that are the same or similar to the style attributes of the target images. The second image generator may be integrated into a part of the computing system or, alternatively, remotely accessed by the computing system.

Next, the second image generator is modified or otherwise caused to generate (i) output images at the first resolution as well as (ii) correlated output images having a second resolution that is different than the first resolution. This may be performed, for instance, by causing the second image generator to output images at different viewports simultaneously or contemporaneously during the execution of a game or other target product for which the second image generator is generating images.

Then, the correlating output images are paired into a set of training data, as previously described (act 1160). These pairings may comprise correlating low-resolution and relatively high-resolution image pairings. The pairings may also include additional correlating images of different resolutions and/or styles and supplemental information to augment the training data sets, as previously described.

As previously mentioned, the disclosed methods also include applying the super-resolution model to the set of training data to generate a trained super-resolution model. During this training, the weights of image processing algorithms incorporated into the super-resolution model are modified to reduce the differences between (i) the target output images (e.g., the high-resolution images in the training data set) with (ii) the actual output images generated by the model as a result of upscaling the low-resolution images the training data set.

As further shown, the methods may also include applying the trained super-resolution model to the same or new target images that are generated by the first image generator that is integrated with the target product (act 1180). In this manner, it is possible to cause the trained super-resolution model to transform low-resolution images output from the first image generator for the target product into high-resolution images during runtime of the target product.

In some instances, the method may also include applying the trained super-resolution model to images of a different target product to generate new high-resolution images and performing a regression analysis on the trained super-resolution model for regression. The regression analysis can be performed for the performance of the super-resolution model relative to the trained super-resolution model for generating the new high-resolution images for the different target product. Based on this regression analysis, the system will either persist (accept and save the modifications) or, alternatively, revert changes that were made to the super-resolution model when generating the trained super-resolution model. The system may revert the changes by deleting a modified version of the model resulting from the most recent training modifications and re-instantiating the model that existed before the most recent training modifications.

The system will persist the changes when it is determined regression to the super-resolution model has not exceeded a regression threshold. Alternatively, when it is determined the regression to the super-resolution model has exceeded the regression threshold then the changes will be reverted so the model returns to the state in which it existed prior to undergoing the changes that caused the regression (act 1190).

Thresholds for determining whether to revert or, alternatively, to persist (e.g., accept and save) the modifications to the model based on the training may include thresholds associated with a loss function for determining convergence of the super-resolution model during training. The decisions for persisting or reverting changes can also be made incrementally as the model is discretely trained on different batches of training data sets for image pairings of the related product(s). For instance, if the loss function of the model identifies a loss in convergence based on new training associated with applying the model to validation data corresponding to a new batch of training data associated with a related product above 1%, 2%, 5%, or another threshold relative to previous loss function calculations performed during training of the super-resolution model for processing images of the different target product, the system will determine to revert the training associated with at least the latest batch of one or more training data set(s) of image pairings for the related product. Alternatively, the system will persist the changes resulting from that training.

Notably, the regression analysis can also be performed prior to and/or subsequent to applying the trained super-resolution model to the target images generated by the first image generator (1180), as shown.

Additionally, after each training epoch, in which the model is applied to a full batch of a training data set, the system may iteratively perform the acts previously described, as shown by dashed arrows. This process will continue, in some instances, until the model reaches a desired threshold of convergence between the model outputs (e.g., high-resolution outputs generated by upscaling the low-resolution images of the training data set image pairings) and the target model outputs (e.g., the high-resolution images of the training data set image pairings). The indicator for convergence can be a percentage of similarity in an objective scale that measures the attributes and quality of the different images. These scales can include, for example, a PSNR and a MS-SSIM or other objective scale, as previously mentioned.

Although not shown, the methods may also include modifying the training data set by replacing the second set of images at the higher-resolution with a third set of images that comprise down-sampled images of the second set of images and corresponding acts for down-sampling the second set of images, as previously described.

FIG. 12 illustrates another flow-diagram of acts associated with related methods to those described with reference to FIG. 11. In this illustration, the acts 1220, 1230, 1260, 1270, 1280 and 1290 are the same as acts 1120, 1130, 1160, 1170, 1180 and 1190, and will not be restated in as much as they are the same. Act 1210 is also very similar to act 1110. However, rather than requiring the identification of a target product that includes an integrated image generator, act 1210 only requires the identification of the generated target images. These target images may be generated by an image generator integrated with a target product associated with the target images or by an image generator that is separate from the target product.

Likewise, act 1240 only requires the obtaining of output images at different resolutions for a related product, without requiring the accessing and modification or processing of the second image generator to generate the output images associated with the related product.

In this manner, the acts of training the super-resolution model can be performed by a model training system without explicitly requiring that system to perform the additional acts of causing the modification of the second image generator (acts 1140 and 1150) and without having to make the explicit identification of the target product used to generate the target images (act 1110). Instead, the system merely needs to obtain the target images (act 1210) and the output images for the related product that have the same style (act 1240) and thereafter train the model as described in reference to acts 1260, 1270, 1280 and 1290.

Figure 13:
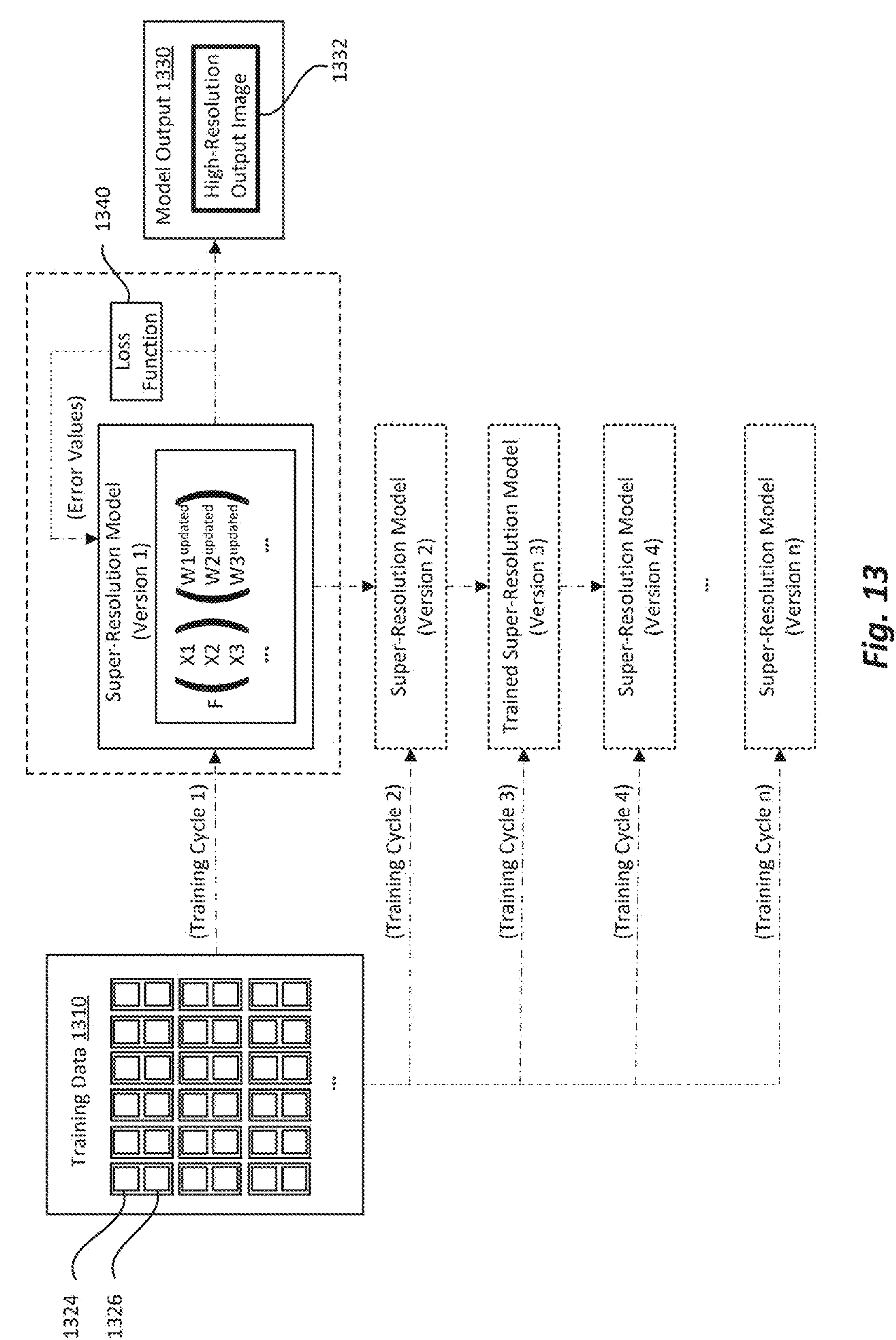
FIG. 13 illustrates an example of a processing flow associated with training process and utilizing training data during training of super-resolution models.

Attention is now directed to FIGS. 13-16, which describe embodiments for dynamically performing training of super-resolution models. FIG. 13, for example, illustrates a super-resolution training and processing flow 1300. As shown, training data 1310 comprises a plurality of image pairs or pairings. Each of these image pairings includes a low-resolution image 1324 and correlating high-resolution image 1326. This training data can be obtained using any of the techniques described herein, such as the techniques for generating the training data from an image generator that is modified to generate correlating images at different viewports, as well as with other techniques (e.g., obtaining training data from a third-party source).

The training data 1310 may include hundreds, thousands, tens of thousands, hundreds of thousands, or even more image pairings. The image pairings may include images that have the same style attributes or similar style attributes to the domain that the super-resolution model is being trained to perform super-resolution processing for.

During training of and subsequent processing by the super-resolution model, the super-resolution model is applied to low-resolution images to generate high-resolution model output 1330 comprising high-resolution images 1332.

During training cycles, such as the illustrated Training Cycle 1, the super-resolution model is applied to the training data 1310 multiple times or for multiple epochs, where each epoch comprises the processing of the complete set of the training data 1310. During the training cycle, the loss function 1340 (which actually may be one or more loss-function, as described in more detail below) is used to quantify the differences between the high-resolution output image 1332 for the high-resolution image 1326 that is paired with the correlating low-resolution image 1326 from the training data 1310 that is processed by the super-resolution model. The error values are then used to update the model parameters and weights of those parameters, as previously described, to generate a modified super-resolution model.

By way of example, the processing of Training Cycle 1, in which the super-resolution model (Version 1) is applied to the training data 1310, is the modification of super-resolution model (Version 1) unto the formation of super-resolution model (Version 2). Likewise, the application of super-resolution model (Version 2) to the training data 1310 during Training Cycle 2, is the modification of super-resolution model (Version 2) unto the formation of super-resolution model (Version 3), and the application of super-resolution model (Version 3) to the training data 1310 during Training Cycle 3 is the modification of super-resolution model (Version 3) unto the formation of super-resolution model (Version 4), and so forth.

Notably, during each training cycle in which the super-resolution model is applied to a full epoch of training data, the super-resolution model is applied to every batch of the epoch. It will also be appreciated that the training data can be split into batches of different sizes to help facilitate processing of the training data during each batch iteration. For instance, if the training data set size is 3200 samples of training data and each batch may be sized to 32 samples of training data, each epoch of the training data would require 100 separate batch iterations, during which all of the training data will be processed by the super-resolution model. After each of the 100 batch iterations, the model's weights would then be updated based on the loss function(s).

Accordingly, in this example, if the system processes 10 epochs of the training data 1310, that would result in 1000 updates to the super-resolution model (i.e. 100 batch iterations*10 epochs=1000 version updates, going from Version 1 to Version 1000 of the model, during which the model's weights are updated for each new version).

As previously noted, it is possible for a model to get overfitted or overtrained for a particular domain when it is exposed to too much of the same training data related to that domain. This can have negative consequences of causing regression for the model relative to previous training performed for a different domain. Another problem that can occur is the continuing application of the model to training data when the result of that training is insignificant or results in a diminishing return relative to the time and processing costs associated with applying the model to the training data.

To help address the foregoing problems, some additional processes can be performed to dynamically modify the training of the model to stop the training processes once a threshold rate of change has been detected during a validation process regarding the loss function values generated after each training epoch (see FIGS. 14, 15 and 16)). As discussed, the validation loss is used to determine whether a validation threshold is met and, if so, to stop the training of the model. This can help reduce wasting resources that would be consumed by continuing training when the detected validation losses indicate that ongoing training would have diminishing returns.

Figure 14:
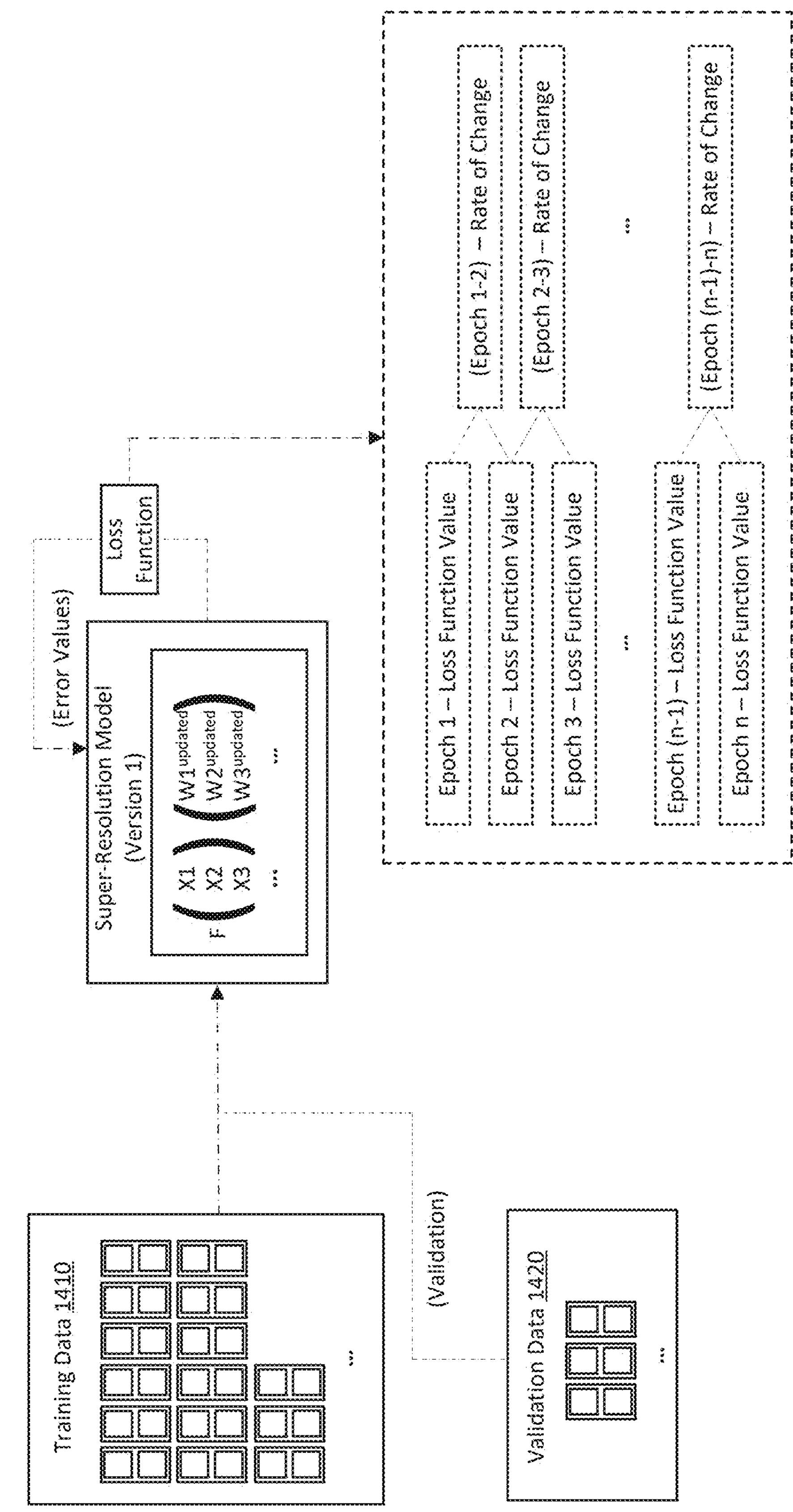
FIG. 14 illustrates another example of a processing flow associated with training process and utilizing training data during training of super-resolution models.

To perform the referenced validation processes, the initial training data 1310 (FIG. 13) is split into two groupings, as shown in the super-resolution training and processing flow 1400 of FIG. 14, including a first grouping of training data 1410 and a second grouping of validation data 1420.

Preferably, all of the image pairings within the resultant groupings of training data 1410 and validation data 1420 originate from the superset of training data image pairings that are obtained from the same source and that were generated by common processing (e.g., a modified image engine that generates images from a same game or other program title or domain that the model is being trained for, and using the same modifications of the image engine to generate the images for the validation data grouping 1420 and the training data grouping 1410). This can be important as the validation data 1420 is likely to be more relevant for validating training effectiveness of the training data 1410 that it is more similar to, and it is likely to be more similar to data that is generated in a common environment from a same source.

To facilitate this consistency, it is preferred that the validation data 1420 be segregated from an initial superset of training data (e.g., training data 1310) to result in the formation of the two groupings of training data 1410 and validation data 1420.

It is also preferred that the grouping of validation data 1420 is a smaller portion of the initial training data 1310 than the resultant grouping of the training data 1410 after the validation data is segregated from the initial training data 1310. One reason for this is because of the scarcity of training data and because it has been found that only a small proportion of the training data is required to perform the validation processes described.

After the grouping of validation data 1420 has been segregated, the training processes include applying the super-resolution model to one or more full epochs of the resultant group of training data 1410 (which remains after omitting the validation data 1420), and after each of which the loss function of the super-resolution model is used to identify changes to be made to the super-resolution model, as previously described.

The training system also tracks and stores the loss function value generated during each epoch of the training as a validation loss value that can be used to determine a rate of change when compared to other loss values calculated after each training cycle. The system also calculates, tracks and stores the rate of change between the loss function values, which were identified training.

Training will continue in this manner until a triggering event occurs. One such triggering event can be the completion of a predetermined number of training epochs (e.g., less than 50, 50, 100, 1000, or more than 1000).

Another triggering event for ending a training cycle can be the determination that the rate of change between sequential epoch loss function values meets a predetermined threshold. For instance, if the system determines the rate of change in the loss function value between two sequential epochs equals or is less than a predetermined threshold value, the system will terminate training cycle of the super-resolution model with the corresponding grouping of training data 1410. In this manner, the system is able to conserve processing time and costs that may otherwise be inefficiently consumed as a result of the diminishing returns for applying the super-resolution model to additional training epochs of that grouping of training data 1410.

The predetermined threshold for terminating the training can be adjusted to accommodate different needs and preferences. In some instances, the predetermined threshold is a rate of change that is equal to or less than 10%, 5%, 2%, 1% or another rate of change.

In some embodiments, the system may also require a minimum number of training epochs to be performed prior to terminating the training, even when the predetermined threshold has been met. This may include performing the minimum number of epochs prior to calculating the rate of change and prior to comparing the rate of change to the predetermined threshold rate of change. In some instances, the minimum number of training epochs for a training cycle of the training data 1410 will be at least 5, 10, 20, 30, 40, 50 or a number greater than 50.

Attention is now directed to FIG. 15, which illustrates another super-resolution training and processing flow 1500. In this embodiment, additional reference product data 1510 can also be processed by the super-resolution model. This reference product data 1510 includes image pairings of low-resolution and high-resolution images for a different domain or reference product that is different than the product used to generate the training data 1410. For instance, the training data 1410 may correspond to images of a first video game and the reference product data 1510 may include images for a second video game and that may also, optionally, be obtained from a different source than was used to generate the training data 1410 for the first video game.

In some instances, a regression analysis is also performed with image pairings of the reference product data 1510 to see whether the super-resolution model has regressed from a previous state of training for processing images corresponding to the reference product data 1510 and related images the super-resolution model may have already been trained to process, as suggested in reference to acts 1190 and 1290 of FIGS. 11 and 12. This determination can be made by applying the super-resolution model to a low-resolution image in the reference product data 1510 and by calculating a loss value that reflects differences in objective image quality measures (e.g., PSNR, MS-SSIM or other measures) between the actual image output (e.g., the high-resolution image generated by the model based on the low-resolution image of the reference product data 1510) with a target output image (e.g., a high-resolution reference image obtained directly from the reference product). If the loss value exceeds a previous loss value obtained during training of the super-resolution model on training data for the reference product, then regression may have occurred.

If regression has occurred, then modifications made to the super-resolution model during the training can be reverted.

When performing the regression analysis, validation processing and training, the super-resolution model may use one or more loss functions, as previously described. For example, as shown in FIG. 15, the super-resolution model may include or use two different loss functions. When there are two or more loss functions used in the training of the model, the system may calculate the epoch loss function values and corresponding rates of changes using any combination of loss function values generated by those different loss functions. For instance, the system may exclusively use only the loss function values from one of the pluralities of loss function values. The system may, alternatively, normalize and/or average the loss function values from different loss functions to generate a composite loss function value for each epoch. The system may also apply different weights to the values of the loss functions differently when generating a composite loss function value for each epoch.

FIG. 15 also illustrates additional processes 1520 in the processing pipeline that may include anti-aliasing, upscaling, downscaling, and/or optimization processes (e.g., changing a size, changing an orientation, cropping, stylizing, coloring, filtering, applying depths or textures, masking, or other image processing) that may be performed before and/or after the super-resolution model is applied to the low-resolution images of the training data, validation data, reference product data, and runtime image data. These additional processes should not negatively impact the utility and effectiveness of the aforementioned training, validation and regression analysis techniques. To the contrary, they may improve the effectiveness and efficiencies of some of these processes, such as by reducing or simplifying the data that is being processed by the super-resolution models.

Figure 16:
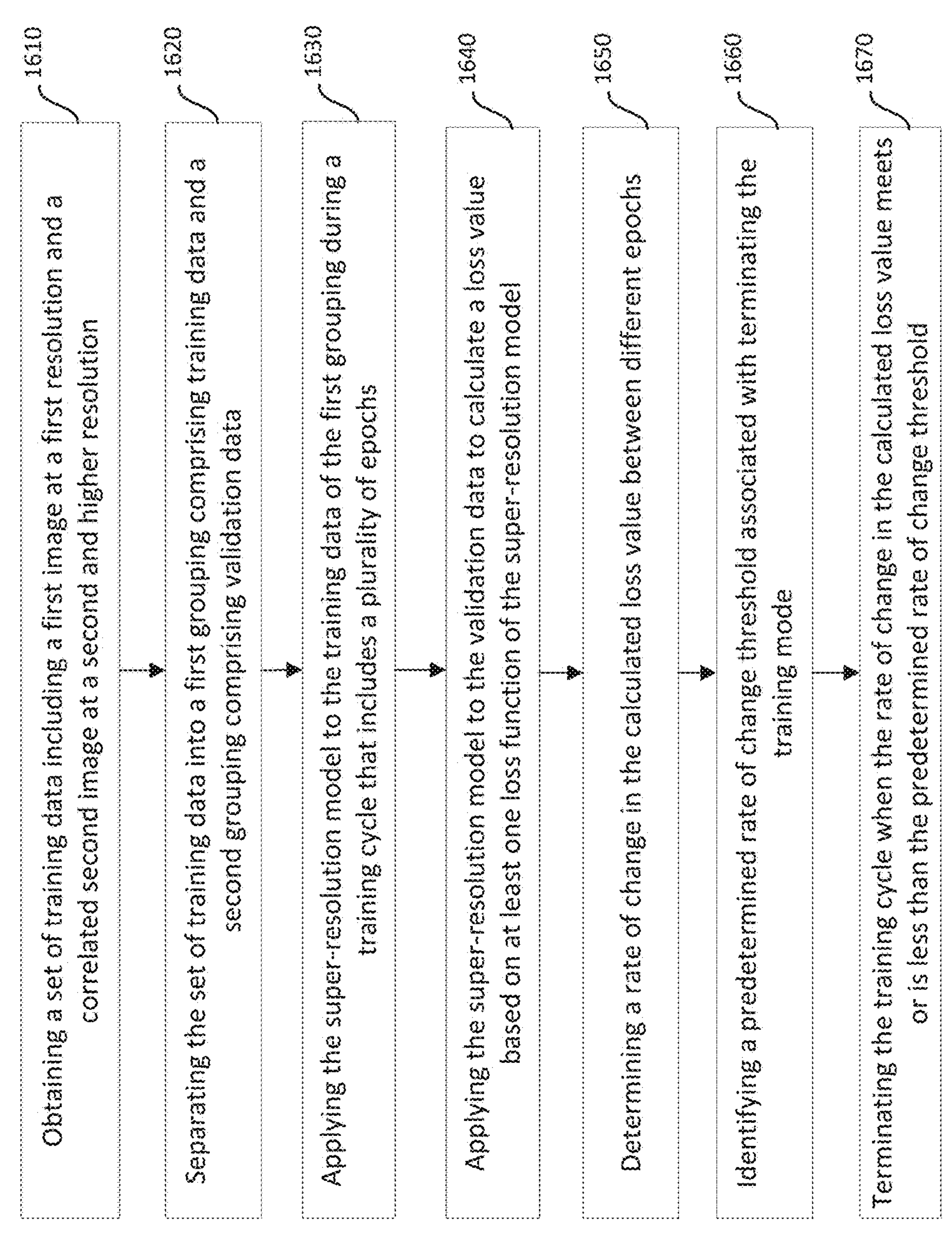
FIG. 16 illustrates an example of a flow diagram of acts associated with methods for utilizing training data for generating trained super-resolution models by applying super-resolution models to the training data.

Attention will now be directed to FIG. 16, which illustrates a flow diagram 1600 of acts associated with methods for performing training of a super-resolution model. These acts may be performed by a computing system that includes one or more hardware processor(s) and a storage medium (e.g., a hardware storage device) having stored computer-executable instructions that are executable by the hardware processor(s) to cause the computing system to implement the disclosed acts and other functionality described herein.

As shown, the acts include obtaining a set of training data including a plurality of correlated image pairings, each correlated image pairing including a first image at a first resolution and a correlated second image at a second resolution, the correlated second image including a higher-resolution representation of the first image (act 1610). The processes for obtaining the training data are described throughout the application.

The next act includes separating the set of training data into a first grouping including training data and a second grouping including validation data (act 1620). Then, the super-resolution model is applied to the training data of the first grouping during a training cycle that includes a plurality of epochs of the super-resolution model processing the first grouping of training data and during which one or more loss functions are used with the super-resolution model to identify error values that are used to modify the super-resolution model (act 1630). These processes, which have been described above, may also include randomizing the training data that is processed, such that the super-resolution model is applied to a different ordering of the training data during each epoch.

As also previously described, the super-resolution model is applied to the validation data to calculate a loss value based on at least one loss function of the super-resolution model (act 1640). This may be performed after each epoch during the training mode or after a predetermined number of epochs have been performed.

Next, a rate of change in the calculated loss value is determined for sequential epochs in the training data (act 1650). A predetermined rate of change threshold associated with terminating the training mode is also identified (act 1660), such as identifying an input from an administrator or other user input that specifies the predetermined rate of change. This predetermined rate of change may also be specified by a third-party and/or be associated with a quality-of-service guarantee requirement for the super-resolution model.

Finally, the training cycle is terminated (act 1670) when the rate of change in the calculated loss value is determined to meet or is less than the predetermined rate of change threshold.

Additional acts may also include any of the other functionality described herein, including the regression analysis processes described above.

Additionally, the foregoing techniques that are described herein for generating and utilizing training data sets of image pairings at different resolutions can also be applied to other types of image processing for different sets of images comprising different formats, styles, orientations, textures and/or other configurations and are paired into training data to thereby facilitate the training of machine learning models for performing corresponding image processing (e.g., changing size, changing orientation, cropping, stylizing, coloring, filtering, applying depths or textures, masking, or other image processing).

The disclosed techniques can help overcome many of the foregoing problems associated with obtaining and utilizing training data, including overfitting and over-processing training data.

It will be appreciated that the disclosed methods may be practiced by a computer system comprising a computer including one or more processors and computer-readable media such as computer memory. In particular, the computer memory may store computer-executable instructions that when executed by one or more processors cause various functions to be performed, such as the acts recited in the embodiments.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), programmable read-only memory (EEPROM), compact disk ROM (CD-ROM), or other optical disk storage (such as compact disks (CDs), digital video disks (DVDs), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, as described herein, the computer properly views the connection as a transmission medium. Transmission media can include a network and/or data links that can be used to carry or desired program code means in the form of computer-executable instructions or data structures which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface card (NIC)), and then eventually transferred to computer system RAM and/or less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers (PCs), desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for training a super-resolution model that is configured to transform images from a first resolution to a second resolution, the second resolution comprising a higher resolution than the first resolution, comprising:

obtaining a set of training data comprising a plurality of correlated image pairings, each correlated image pairing including a first image at a first resolution and a correlated second image at a second resolution that is higher than the first resolution;

separating the set of training data into a first grouping comprising training data and a second grouping comprising validation data;

training the super-resolution model with the training data of the first grouping during a training cycle that includes a plurality of epochs of the super-resolution model processing the first grouping of training data;

after each epoch, applying the super-resolution model to the validation data to calculate a loss value;

determining a rate of change in the calculated loss value between different epochs;

identifying a predetermined rate of change threshold associated with terminating the training cycle; and terminating the training cycle when the rate of change in the calculated loss value meets or is less than the predetermined rate of change threshold.

2. The method of claim 1, wherein the training cycle comprises a predetermined minimum number of epochs and wherein the training cycle is terminated only when both (i) the rate of change in the calculated loss value meets or is less than the predetermined rate of change threshold, and (ii) after the predetermined minimum number of epochs have been performed during the training cycle.

3. The method of claim 2, wherein the predetermined number of epochs is at least five.

4. The method of claim 1, wherein the predetermined threshold is less than 10%.

5. The method of claim 3, wherein the predetermined threshold is less than 5%.

6. The method of claim 3, wherein the predetermined threshold is less than 1%.

7. The method of claim 1, wherein the super-resolution model is applied to a different ordering of the training data for each epoch.

8. The method of claim 1, wherein the loss is calculated with one or more loss functions comprising a first loss function and a second loss function that is of a different type than the first loss function.

9. The method of claim 8, wherein the first loss function comprises a perceptual loss function and the second loss function comprises a non-perceptual loss function.

10. The method of claim 1, wherein the method further includes either persisting or, alternatively, reverting changes made to the super-resolution model during the training cycle, wherein the method includes persisting the changes when it is determined regression to the super-resolution model relative to a reference product has not exceeded a regression threshold and the method alternatively includes reverting the changes when it is determined regression to the super-resolution model has exceeded the regression threshold.

11. A computing system comprising:

a hardware processing system comprising a hardware processor; and one or more storage devices storing executable instructions that are executed by the hardware processing system for causing the computing system to perform operations comprising:

obtaining a set of training data comprising a plurality of correlated image pairings, each correlated image pairing including a first image at a first resolution and a correlated second image at a second resolution that is higher than the first resolution;

separating the set of training data into a first grouping comprising training data and a second grouping comprising validation data;

training the super-resolution model with the training data of the first grouping during a training cycle that includes a plurality of epochs of the super-resolution model processing the first grouping of training data;

iteratively, after each of one or more epochs performed during the training cycle, applying the super-resolution model to the validation data to calculate a loss value;

determining a rate of change in the calculated loss value between different epochs;

identifying a predetermined rate of change threshold associated with terminating the training mode; and terminating the training cycle when the rate of change in the calculated loss value meets or is less than the predetermined rate of change threshold.

12. The computing system of claim 11, wherein the training cycle comprises a predetermined minimum number of epochs and wherein the training cycle is terminated only when both (i) the rate of change in the calculated loss value meets or is less than the predetermined rate of change threshold, and (ii) after the predetermined minimum number of epochs have been performed during the training cycle.

13. The computing system of claim 11, wherein the super-resolution model is applied to the training data within the first grouping according to a randomized ordering of the correlated image-pairings for each epoch.

14. The computing system of claim 11, wherein the loss is calculated with one or more loss functions comprising a first loss function and a second loss function that is of a different type than the first loss function.

15. The computing system of claim 14, wherein the first loss function comprises a perceptual loss function.

16. The computing system of claim 15, wherein the second loss function comprises a non-perceptual loss function.

17. The computing system of claim 11, wherein the method further includes persisting changes made during the training cycle in response to determining regression to the super-resolution model relative to a reference product has not exceeded a regression threshold.

18. The computing system of claim 11, wherein the method includes reverting changes made during the training cycle when it is determined regression to the super-resolution model relative to a reference product has exceeded a regression threshold.

19. The computing system of claim 11, wherein the first grouping comprising training data contains more correlated image pairings than the second grouping comprising validation data.

20. The computing system of claim 11, wherein image pairings in the second grouping comprising validation data are obtained from a same source as image pairings in the first grouping comprising training data.

* * * * *